US011693655B2

(12) United States Patent
Sa et al.

(10) Patent No.: US 11,693,655 B2
(45) Date of Patent: Jul. 4, 2023

(54) METHOD, APPARATUS, AND SYSTEM FOR OUTPUTTING A DEVELOPMENT UNIT PERFORMANCE INSIGHT INTERFACE COMPONENT COMPRISING A VISUAL EMPHASIS ELEMENT IN RESPONSE TO AN INSIGHT INTERFACE COMPONENT REQUEST

(71) Applicants: ATLASSIAN PTY LTD., Sydney (AU); ATLASSIAN, INC., San Francisco, CA (US)

(72) Inventors: Seung Yeon Sa, Sydney (AU); Matthew McCheyne Jensen, Sydney (AU); David Keith Robinson, Austin, TX (US); Marcus David Peterson, Sydney (AU); Tomas Kenis, Sydney (AU); Felipe Garbuglio Drukas Reis, Tweed Heads (AU); Ziming Wang, Sydney (AU)

(73) Assignees: ATLASSIAN PTY LTD., Sydney (AU); ATLASSIAN, INC., San Francisco, CA (US)

(*) Notice: Subject to any disclaimer, the term of this patent is extended or adjusted under 35 U.S.C. 154(b) by 155 days.

(21) Appl. No.: 17/233,775

(22) Filed: Apr. 19, 2021

(65) Prior Publication Data
US 2022/0334837 A1 Oct. 20, 2022

(51) Int. Cl.
G06F 9/44 (2018.01)
G06F 9/445 (2018.01)
(Continued)

(52) U.S. Cl.
CPC ............... G06F 8/77 (2013.01); G06F 8/20 (2013.01); G06F 8/34 (2013.01); G06F 8/71 (2013.01)

(58) Field of Classification Search
CPC ..... G06F 8/77; G06F 8/20; G06F 8/34; G06F 8/71
See application file for complete search history.

(56) References Cited

U.S. PATENT DOCUMENTS 10,114,636 B2 * 10/2018 Lehner ................ G06F 11/3409
10,534,585 B1 * 1/2020 Eberlein ................. G06N 5/04
(Continued)

FOREIGN PATENT DOCUMENTS

CN 105786999 A * 7/2016
EP 3282363 A1 * 2/2018 .......... G06F 11/3672

OTHER PUBLICATIONS

Stanley Ewenike, Cloud Based Collaborative Software Development: A Review, Gap Analysis and Future Directions, 2017, pp. 1-9. https://eprints.staffs.ac.uk/4414/1/7.pdf (Year: 2017).*

(Continued)

Primary Examiner — Mongbao Nguyen
(74) Attorney, Agent, or Firm — Alston & Bird LLP

(57) ABSTRACT

Methods, apparatuses, systems, and computer program products are disclosed for outputting a contextually relevant development unit performance insight interface component in a project management and collaboration system. In an example embodiment, an apparatus detects an insight interface component request, accesses past development unit performance metrics data, determines a suggested development unit performance target, determines a selected development unit commitment, determines a visual emphasis element for the selected development unit commitment, wherein the visual emphasis element is configured to visually compare the selected development unit commitment to the suggested development unit performance target, generates a development unit performance summary insight interface component comprising the visual emphasis element, (Continued)

and outputs the development unit performance summary insight interface component for rendering to a project management user interface.

26 Claims, 14 Drawing Sheets

(51) Int. Cl.
   *G06F 9/455* (2018.01)
   *G06F 8/77* (2018.01)
   *G06F 8/34* (2018.01)
   *G06F 8/20* (2018.01)
   *G06F 8/71* (2018.01)

(56) References Cited

U.S. PATENT DOCUMENTS

| | | | | |
|---|---|---|---|---|
| 10,810,009 | B2* | 10/2020 | van Schaik | G06F 16/90324 |
| 11,429,378 | B1* | 8/2022 | Goel | G06F 8/71 |
| 11,487,538 | B1* | 11/2022 | Gove, Jr. | G06F 8/77 |
| 2014/0222497 | A1* | 8/2014 | Cantor | G06Q 10/06 705/7.28 |
| 2017/0371626 | A1* | 12/2017 | Abebe | G06Q 10/06313 |
| 2019/0294528 | A1* | 9/2019 | Avisror | G06F 11/3688 |
| 2020/0218623 | A1* | 7/2020 | Zhang | G06N 7/005 |
| 2020/0293310 | A1* | 9/2020 | Mittell | G06F 8/76 |
| 2022/0012019 | A1* | 1/2022 | Wilson-Thomas | G06F 8/36 |
| 2022/0222623 | A1* | 7/2022 | Stump | G06Q 10/103 |
| 2022/0309418 | A1* | 9/2022 | Chivukula | G06F 8/71 |
| 2022/0317978 | A1* | 10/2022 | Barik | G06F 8/20 |

OTHER PUBLICATIONS

Vibhu Saujanya Sharma, PIVoT: Project Insights and Visualization Toolkit, 2012, pp. 1-7. https://ieeexplore.ieee.org/stamp/stamp.jsp?tp=&arnumber=6226995 (Year: 2012).*

* cited by examiner

METHOD, APPARATUS, AND SYSTEM FOR OUTPUTTING A DEVELOPMENT UNIT PERFORMANCE INSIGHT INTERFACE COMPONENT COMPRISING A VISUAL EMPHASIS ELEMENT IN RESPONSE TO AN INSIGHT INTERFACE COMPONENT REQUEST

BACKGROUND

Various methods, apparatuses, and systems provide tools for users to plan, collaborate, and monitor projects and tasks in project management and collaboration systems. Applicant has identified a number of deficiencies and problems associated with efficiently and effectively providing performance metrics, statistics, suggestions, and/or recommendations for managing commitments and monitoring progress associated with such projects and tasks in existing project management and collaboration systems. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved methods, apparatuses, systems, and computer program products configured for outputting efficient and contextually relevant development unit performance insight interface component(s), in real-time or near real-time, in a project management and collaboration system. In accordance with one exemplary embodiment of the present disclosure, an apparatus is provided for outputting a contextually relevant development unit performance insight interface component in a project management and collaboration system. The apparatus comprises at least one processor, and at least one memory including program code, the at least one memory and the program code configured to, with the at least one processor, cause the apparatus to at least detect an insight interface component request in response to user interaction with a project management user interface, wherein the insight interface component request is associated with a selected development unit identifier, access past development unit performance metrics data, determine, via the at least one processor, a suggested development unit performance target based at least in part on the past development unit performance metrics data, determine, via the at least one processor, a selected development unit commitment, and determine, via the at least one processor, a visual emphasis element for the selected development unit commitment based at least in part on the suggested development unit performance target, wherein the visual emphasis element is configured to visually compare the selected development unit commitment to the suggested development unit performance target. The program code is configured to, with the at least one processor, further cause the apparatus to generate a development unit performance summary insight interface component comprising the visual emphasis element and output the development unit performance summary insight interface component for rendering to the project management user interface.

In one embodiment, determining the selected development unit commitment comprises determining whether the selected development unit identifier is associated with an assigned development unit commitment estimation methodology, in response to determining that the selected development unit identifier is associated with an assigned development unit commitment estimation methodology, querying a development unit repository based on the selected development unit identifier, receiving development unit commitment data associated with the selected development unit identifier, and calculating the selected development unit commitment based on at least the development unit commitment data and the associated assigned development unit commitment estimation methodology. In some embodiments, the assigned development unit commitment estimation methodology is selected from story points, time, issue count, and customized estimation.

In some further embodiments, the program code is further configured to, with the at least one processor, cause the apparatus to cause storage of the suggested development unit performance target and the selected development unit commitment, detect development unit commitment update events associated with the selected development unit identifier, determine an updated selected development unit commitment based on the stored selected development unit commitment and the detected development unit commitment update events, cause storage of the updated selected development unit commitment, and output an updated development unit performance summary insight interface component, the updated development unit performance summary insight interface component applying the updated selected development unit commitment.

In one embodiment, determining the updated selected development unit commitment and outputting the updated development unit performance summary insight interface component are done in real-time or near real-time. In other embodiments, determining the updated selected development unit commitment and outputting the updated development unit performance summary insight interface component are done at a predetermined time interval.

In still further embodiments, the program code is further configured to, with the at least one processor, cause the apparatus to determine, via the at least one processor, an updated visual emphasis element for the updated selected development unit commitment and apply the updated visual emphasis element to the updated selected development unit commitment in the updated development unit performance summary insight interface component.

In one embodiment, determining the selected development unit commitment comprises determining whether the selected development unit identifier is associated with an assigned development unit commitment estimation methodology, in response to determining that the selected development unit identifier is not associated with an assigned development unit commitment estimation methodology, accessing past development unit data to identify one or more past development units, extracting one or more past development unit features and a past development unit commitment estimate value from each of the one or more identified past development units, accessing development unit data associated with the selected development unit identifier, parsing the development unit data associated with the selected development unit identifier based at least in part on the extracted one or more past development unit features, assigning a first development unit commitment estimation methodology to the selected development unit identifier based at least in part on the past development unit commitment estimate values associated with the identified past development units, and calculating a commitment estimate value for the selected development unit identifier, the commitment estimate value corresponding to the selected development unit commitment.

In this regard, in some embodiments, calculating the commitment estimate value for the selected development unit identifier is based at least in part on an analysis of the assigned first development unit commitment estimation methodology, the extracted one or more past development unit features, the past development unit commitment estimate values, and the parsed development unit data. In some further embodiments, calculating the commitment estimate value for the selected development unit identifier is based on a machine learning model.

In one embodiment, determining the suggested development unit performance target is based on a machine learning model, wherein the machine learning model is trained using past development unit performance metrics data.

In one embodiment, the visual emphasis element employs a contextually relevant coloring scheme to visually compare the selected development unit commitment to the suggested development unit performance target.

In some embodiments, the suggested development unit performance target is associated with one or more past development unit identifiers and the program code is further configured to, with the at least one processor, cause the apparatus to detect a development unit performance detailed insight interface component request in response to user interaction with the development unit performance summary insight interface component, determine, via the at least one processor, a visual element for each of the one or more past development unit identifiers associated with the suggested development unit performance target, determine, via the at least one processor, a correlated visual element for the selected development unit commitment, generate a development unit performance detailed insight interface component comprising the visual elements of the one or more past development unit identifiers associated with the suggested development unit performance target and the correlated visual element of the selected development unit commitment, wherein the visual emphasis element is applied to the correlated visual element of the selected development unit commitment, and replace the development unit performance summary insight interface component with the development unit performance detailed insight interface component in the project management user interface. In some further embodiments, the program code is further configured to, with the at least one processor, cause the apparatus to detect a hover user interaction corresponding to at least one of the visual elements of the one or more past development unit identifiers in the development unit performance detailed insight interface component and output past development unit performance metrics data associated with the past development unit identifier associated with the at least one of the visual elements corresponding to the detected hover user interaction.

In some embodiments, the visual element for each of the one or more past development unit identifiers associated with the suggested development unit performance target is a vertical bar in a vertical bar chart format, wherein the vertical bars are visually adjacent to one another, a total height of each of the vertical bars corresponds to a total committed development unit estimate associated with the corresponding past development identifier, and an emphasis height of each of the vertical bars corresponds to a total development unit completion value associated with the corresponding past development unit identifier. In some further embodiments, the correlated visual element for the selected development unit commitment is a correlated vertical bar in the vertical bar chart format, a total height of the correlated vertical bar corresponding to a development unit commitment estimate value associated with the selected development unit commitment, and the visual emphasis element is a contextually relevant coloring scheme applied to the correlated vertical bar of the selected development unit commitment.

In one embodiment, the past development unit performance metrics data comprises a total development unit completion value and a total development unit commitment estimate value for each of one or more completed development units. In some further embodiments, the suggested development unit performance target is determined as an average of the total development unit completion value associated with one or more of the most recent completed development units. In some embodiments, the suggested development unit performance target is a target range based on the total development unit completion value associated with one or more of the most recent completed development units. In still further embodiments, the suggested development unit performance target is determined as a completion percentage associated with one or more of the most recent completed development units. In some further embodiments, the past development unit performance metrics data further comprises seasonality data and event data associated with each of the one or more completed development units.

In one embodiment, the project management user interface is associated with a planning phase of a selected development unit.

In some embodiments, the insight interface component request is associated with a create development unit request.

In some embodiments, the program code is further configured to, with the at least one processor, cause the apparatus to in response to detecting the insight interface component request, determine one or more issue type commitments associated with the selected development unit commitment, determine the relative percentage of each of the one or more issue type commitments, rank the one or more issue type commitments based on the relative percentages, generate an issue type summary insight interface component comprising at least one of the one or more ranked issue type commitments, and output the issue type summary insight interface component for rendering to the project management user interface. In some further embodiments, the program code is further configured to, with the at least one processor, cause the apparatus to detect an issue type detailed insight interface component request in response to user interaction with the issue type summary insight interface component, determine, via the at least one processor, a visual status icon for each of the one or more ranked issue type commitments, generate an issue type detailed insight interface component comprising the visual status icon of the one or more ranked issue type commitments, and replace the issue type summary insight interface component with the issue type detailed insight interface component in the project management user interface. In some further embodiments, the visual status icon for each of the one or more ranked issue type commitments is a horizontal bar reflecting the relative percentage of the corresponding issue type commitment.

In one embodiment, the project management user interface is associated with planning a future development unit.

In accordance with another exemplary embodiment of the present disclosure, an apparatus is provided for outputting a contextually relevant development unit performance insight interface component in a project management and collaboration system. The apparatus comprises at least one processor, and at least one memory including program code, the at least one memory and the program code configured to, with the at least one processor, cause the apparatus to detect an insight interface component request in response to user interaction with a project management user interface, wherein the insight interface component request is associated with a selected development unit identifier, determine, via the at least one processor, a selected development unit commitment, determine, via the at least one processor, a commitment completion percentage measurement of the selected development unit commitment, determine, via the at least one processor, a visual progress status indicator component, wherein the visual progress status indicator component is configured to visually depict the commitment completion percentage measurement of the selected development unit commitment, generate a development unit performance summary insight interface component comprising the visual progress status indicator component, and output the development unit performance summary insight interface component for rendering to the project management user interface. In some embodiments, the visual progress status indicator component comprises at least three portions, a first portion associated with a completed portion, a second portion associated with an in progress portion, and a third portion associated with a not yet started portion of the selected development unit commitment. In some further embodiments, the program code is further configured to, with the at least one processor, cause the apparatus to determine a relative percentage measurement for each of the in progress portion and the not yet started portion of the selected development unit commitment. In still further embodiments, each of the at least three portions is depicted in a different color.

In one embodiment, the program code is further configured to, with the at least one processor, cause the apparatus to detect a development unit performance detailed insight interface component request in response to user interaction with the development unit performance summary insight interface component, determine a relative percentage measurement for each of a completed portion of the development unit commitment, an in progress portion of the development unit commitment, and a not yet started portion the development unit commitment, generate a development unit performance detailed insight interface component comprising the visual progress status indicator component and an alphanumeric depiction of each of the relative percentage measurements of each of the in progress portion, the completed portion, and the not yet started portion, and replace the development unit performance summary insight interface component with the development unit performance detailed insight interface component in the project management user interface. In some embodiments, each of the alphanumeric depictions is caused to be depicted in a different color. In some embodiments, the project management user interface is associated with an active development unit.

In accordance with another exemplary embodiment of the present disclosure, an apparatus is provided for outputting a contextually relevant development unit performance insight interface component in a project management and collaboration system. The apparatus comprises at least one processor, and at least one memory including program code, the at least one memory and the program code configured to, with the at least one processor, cause the apparatus to detect an insight interface component request in response to user interaction with a project management user interface, wherein the insight interface component request is associated with a selected team identifier, determine, via the at least one processor, a total number of deployments associated with the selected team identifier corresponding to a pre-defined period of time, determine, via the at least one processor, a deployment frequency associated with the selected team identifier corresponding to one or more past pre-defined periods of time, determine, via the at least one processor, a visual emphasis element, wherein the visual emphasis element is configured to visually compare the total number of deployments to the deployment frequency, generate a first development unit performance summary insight interface component comprising the visual emphasis element, and output the first development unit performance summary insight interface component for rendering to the project management user interface.

In some embodiments, the program code is further configured to, with the at least one processor, cause the apparatus to in response to detecting the insight interface component request, determine an average cycle time associated with a pre-defined period of time, determine, via the at least one processor, a past average cycle time associated with one or more past pre-defined periods of time, determine, via the at least one processor, a visual emphasis element associated with the average cycle time, wherein the visual emphasis element associated with the average cycle time is configured to visually compare the average cycle time to the past average cycle time, generate a second development unit performance summary insight interface component comprising the visual emphasis element associated with the average cycle time, and output the second development unit performance summary insight interface component for rendering to the project management user interface. In some further embodiments, the project management user interface is associated with a deployments view.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
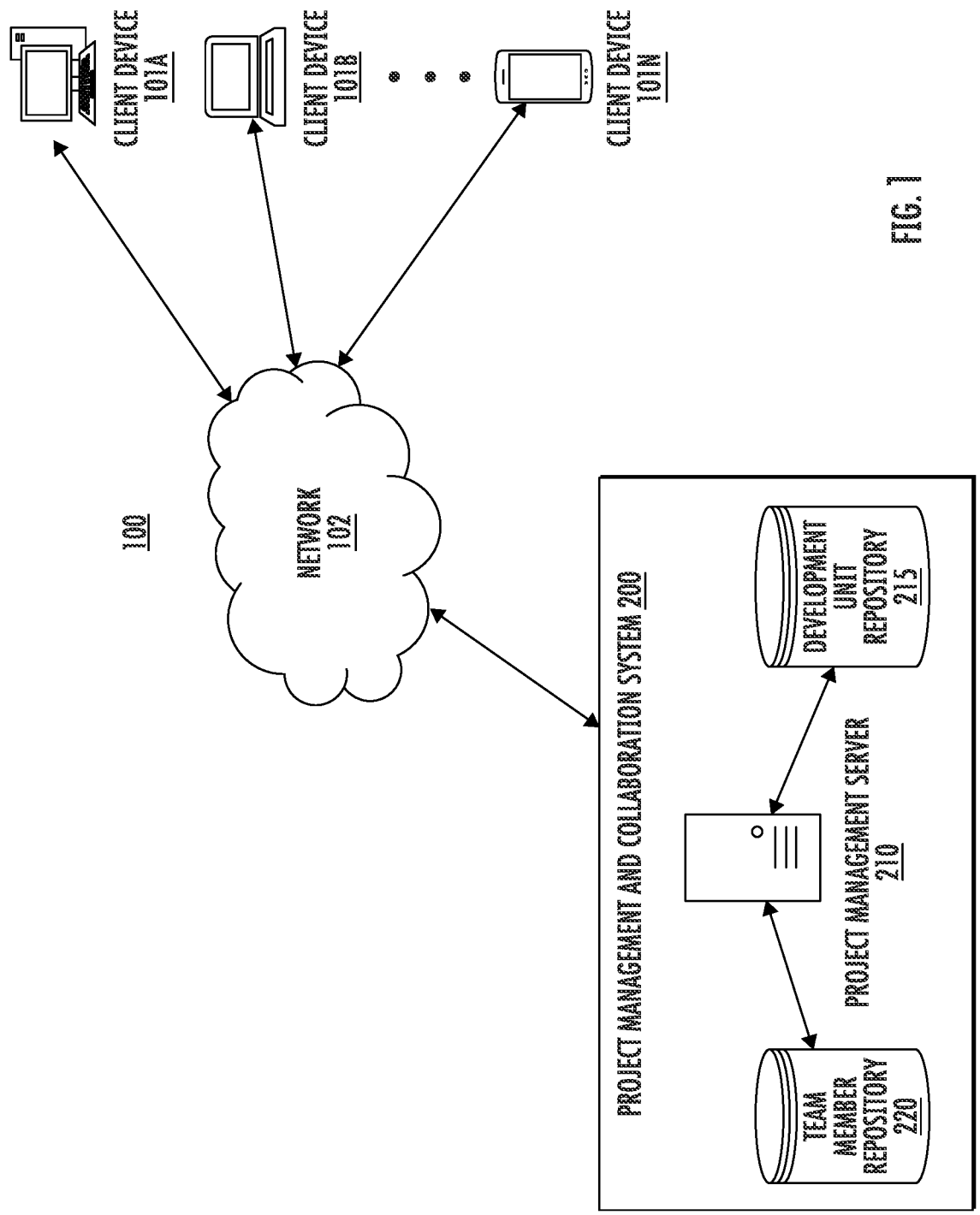
Figure 2:
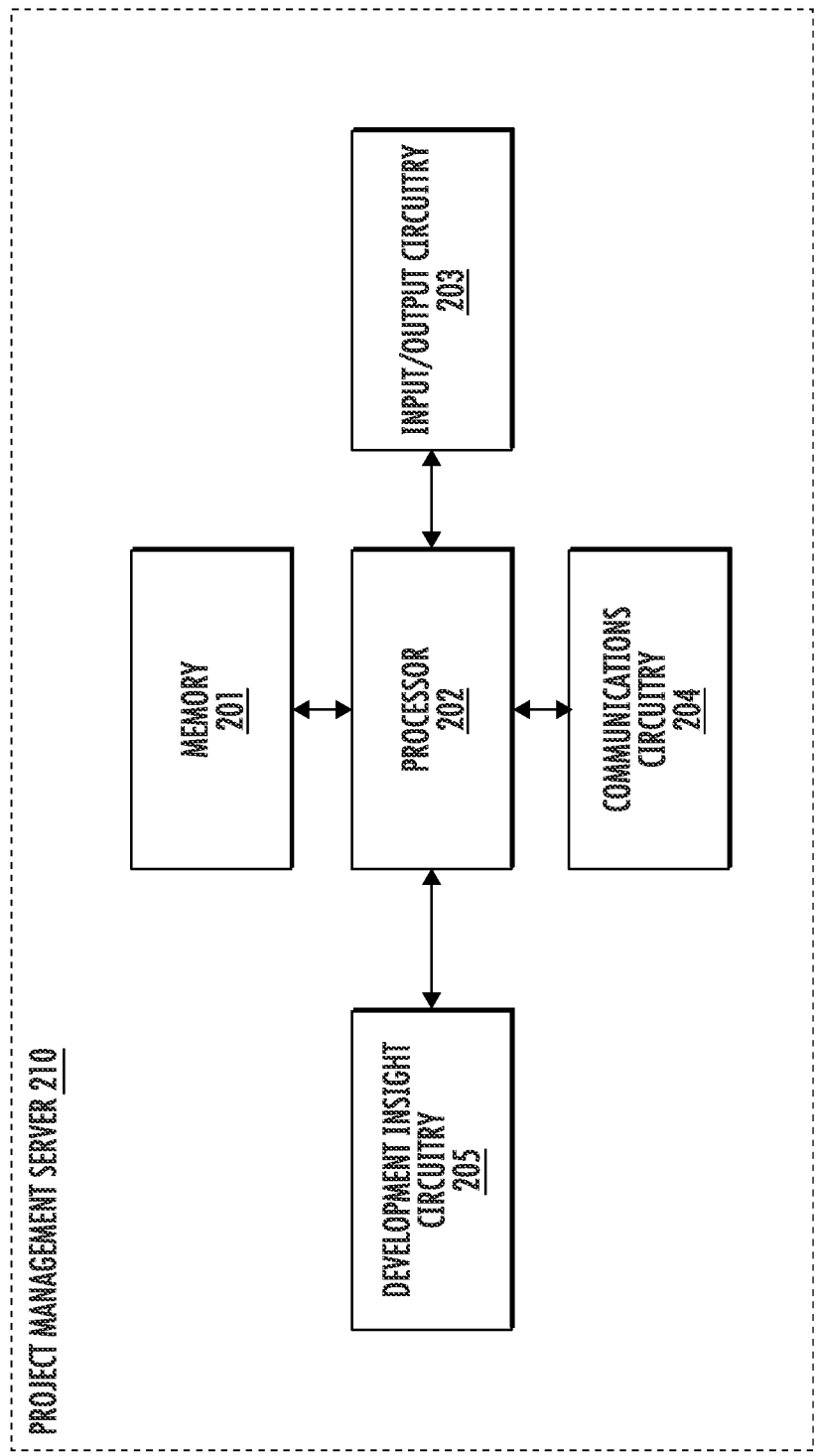
Figure 3A:
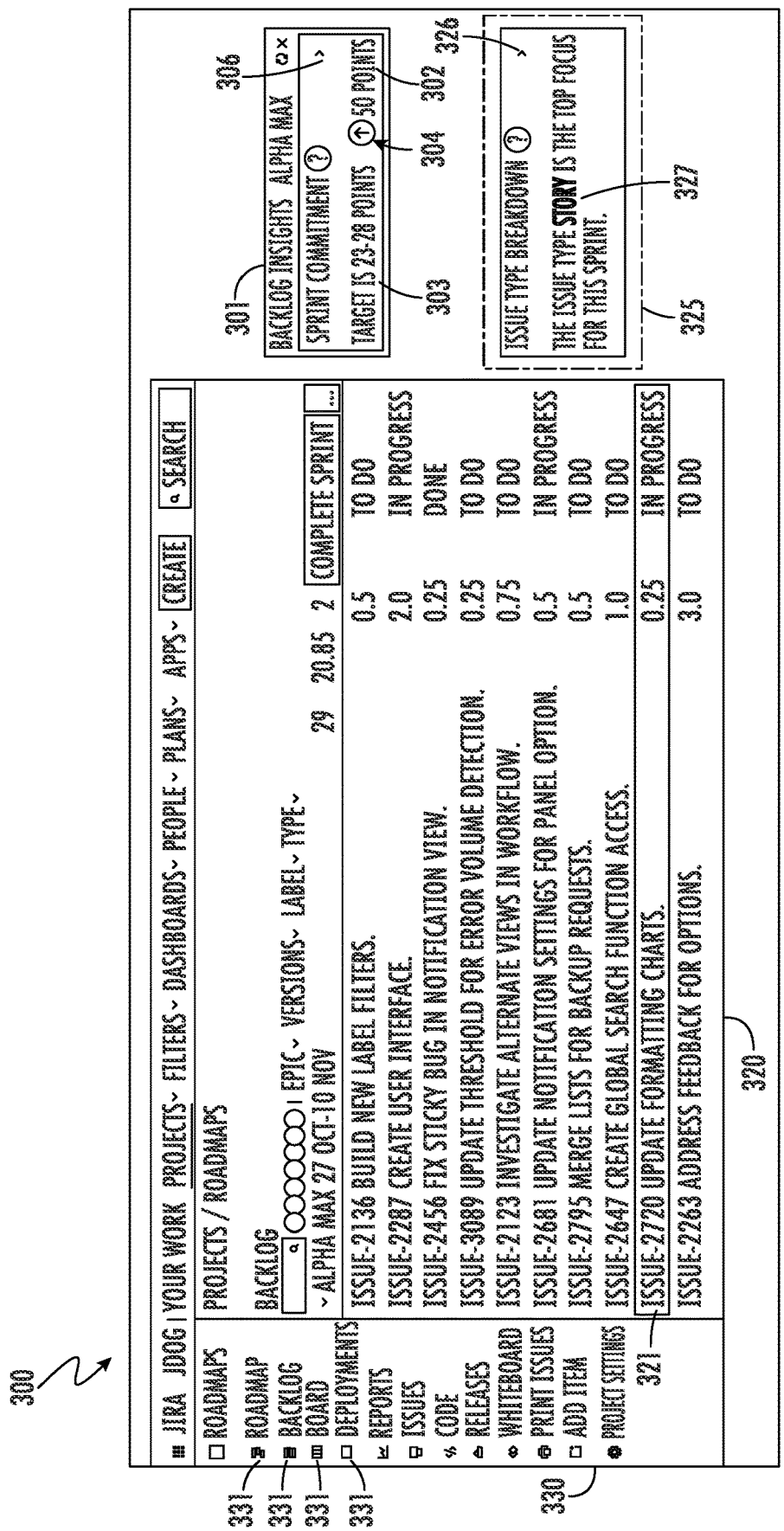
Figure 3B:
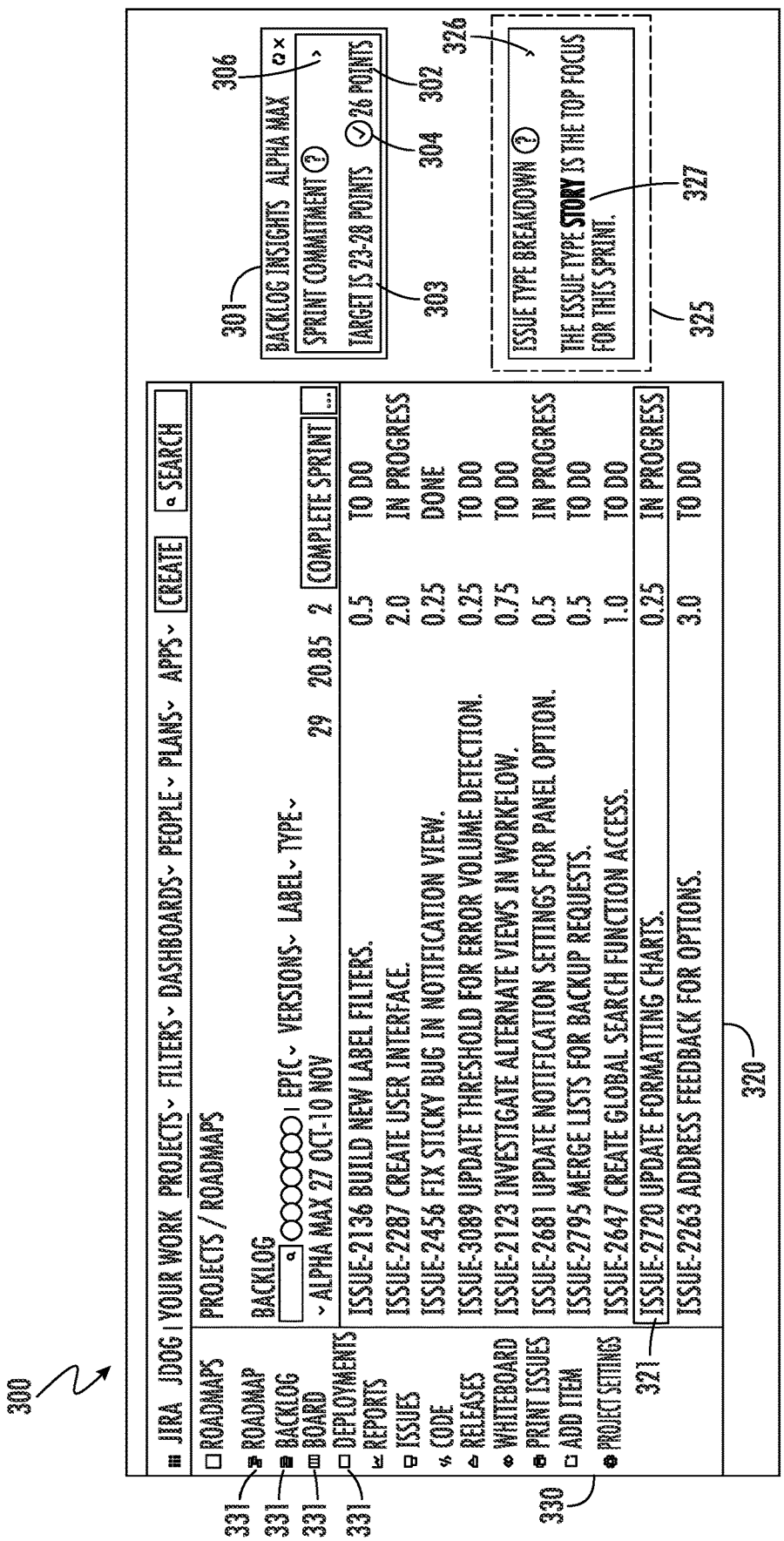
Figure 3C:
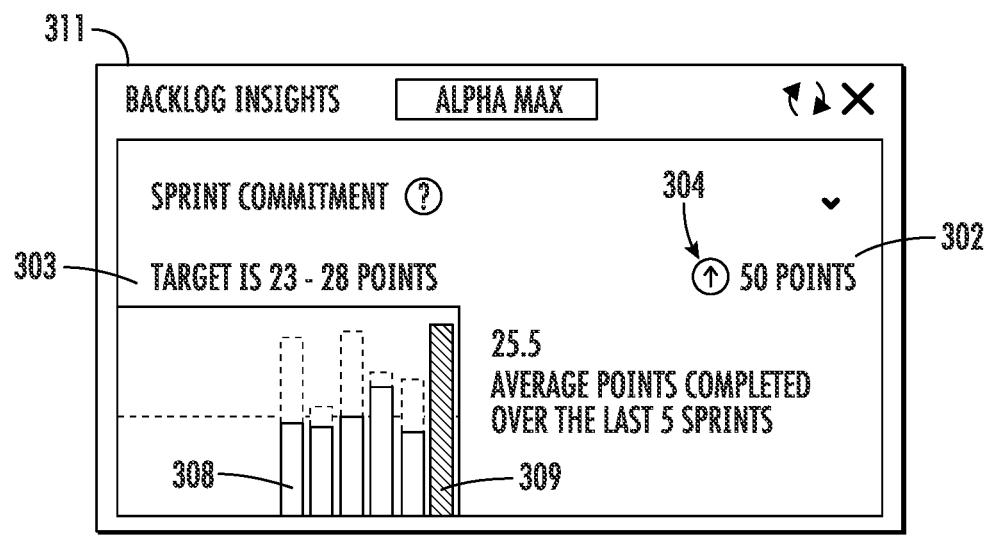
Figure 3D:
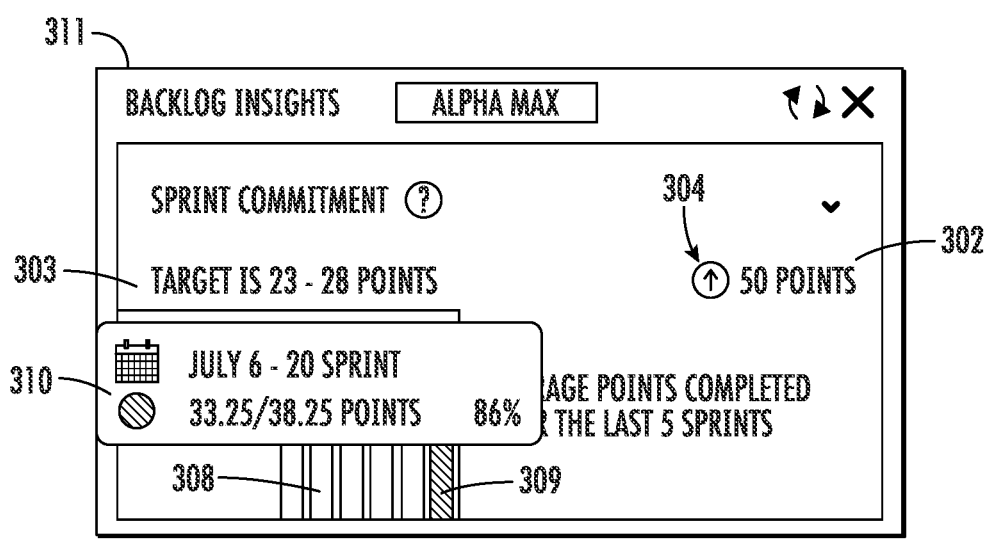
Figure 3E:
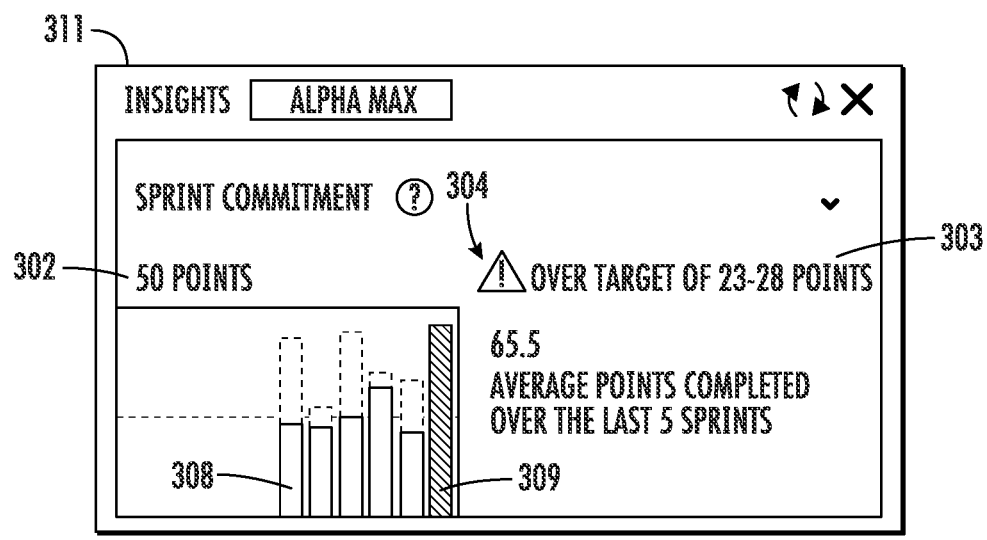
Figure 3F:
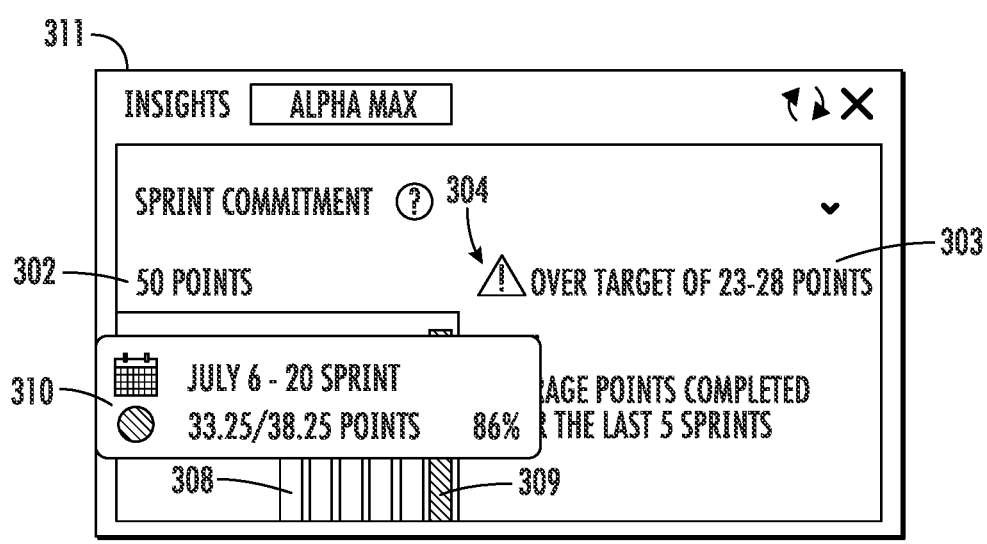
Figure 3G:
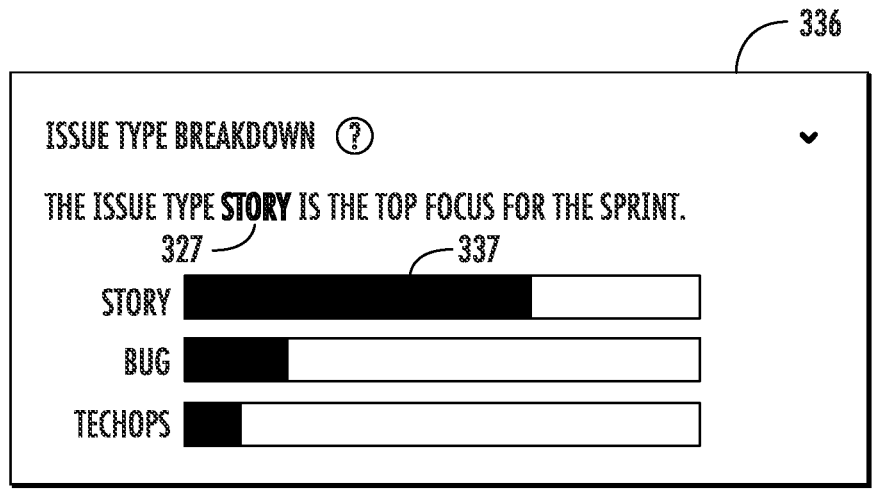
Figure 3H:
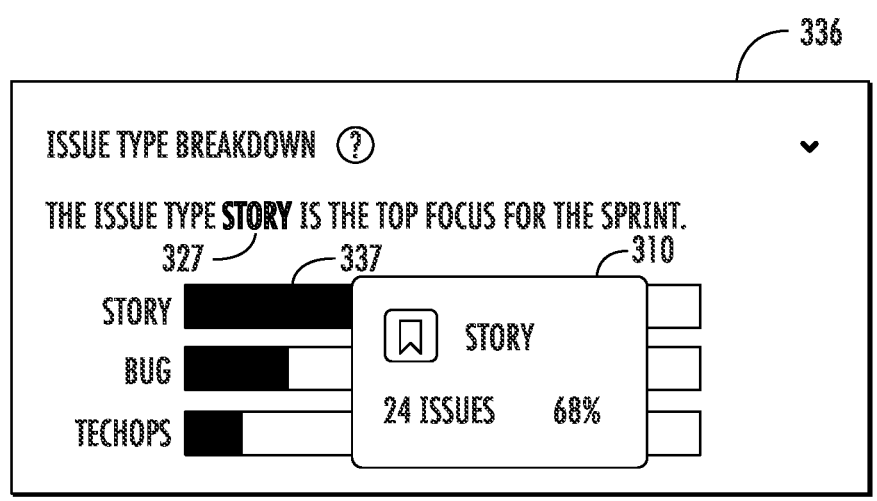
Figure 4A:
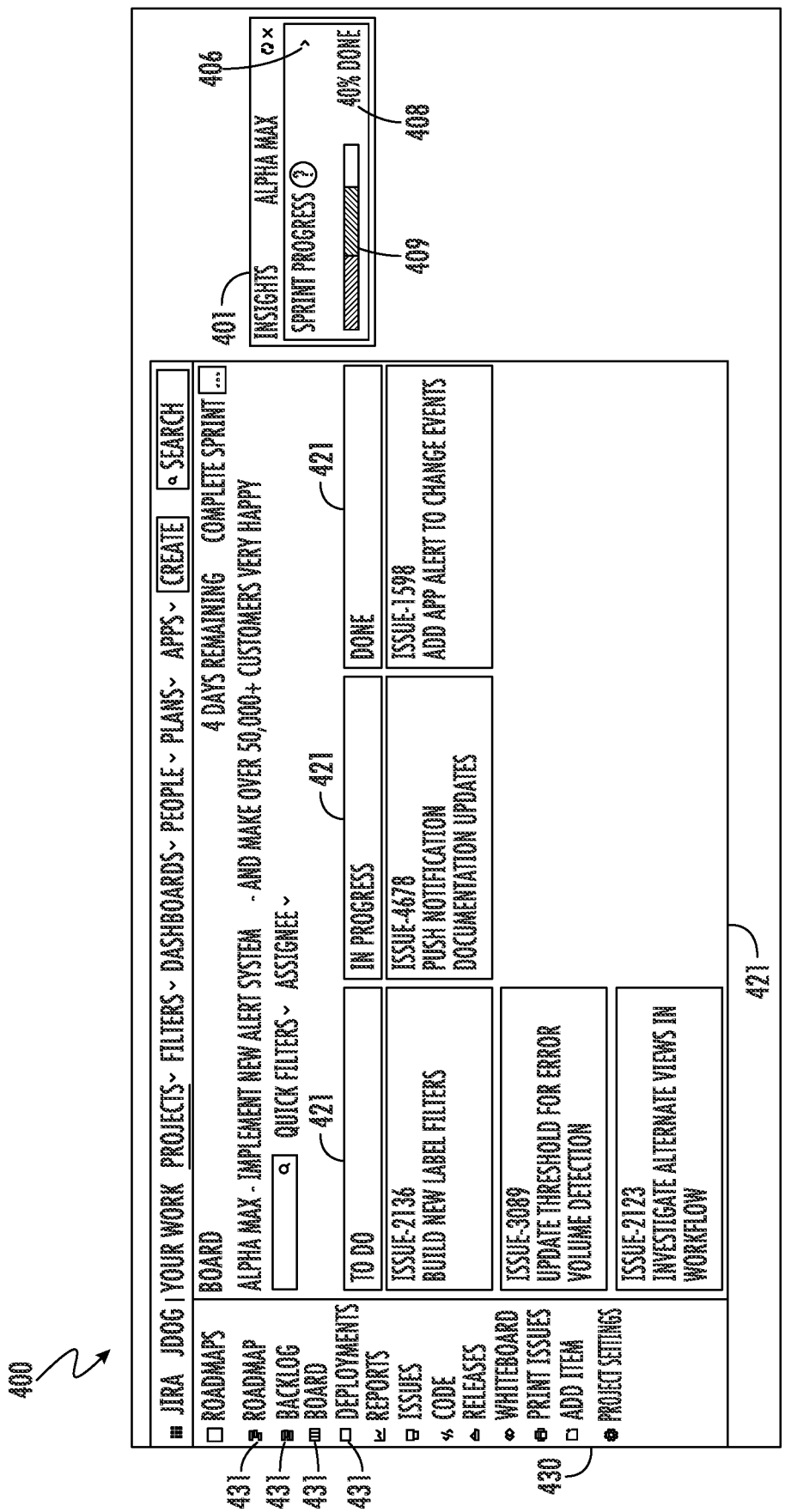
Figure 4B:
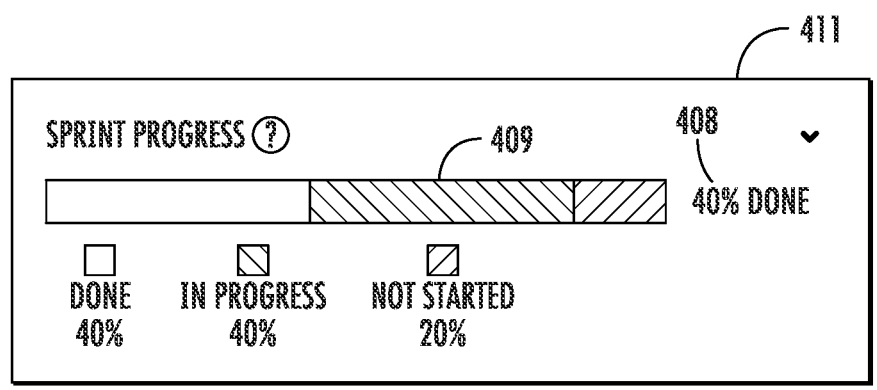
Figure 5A:
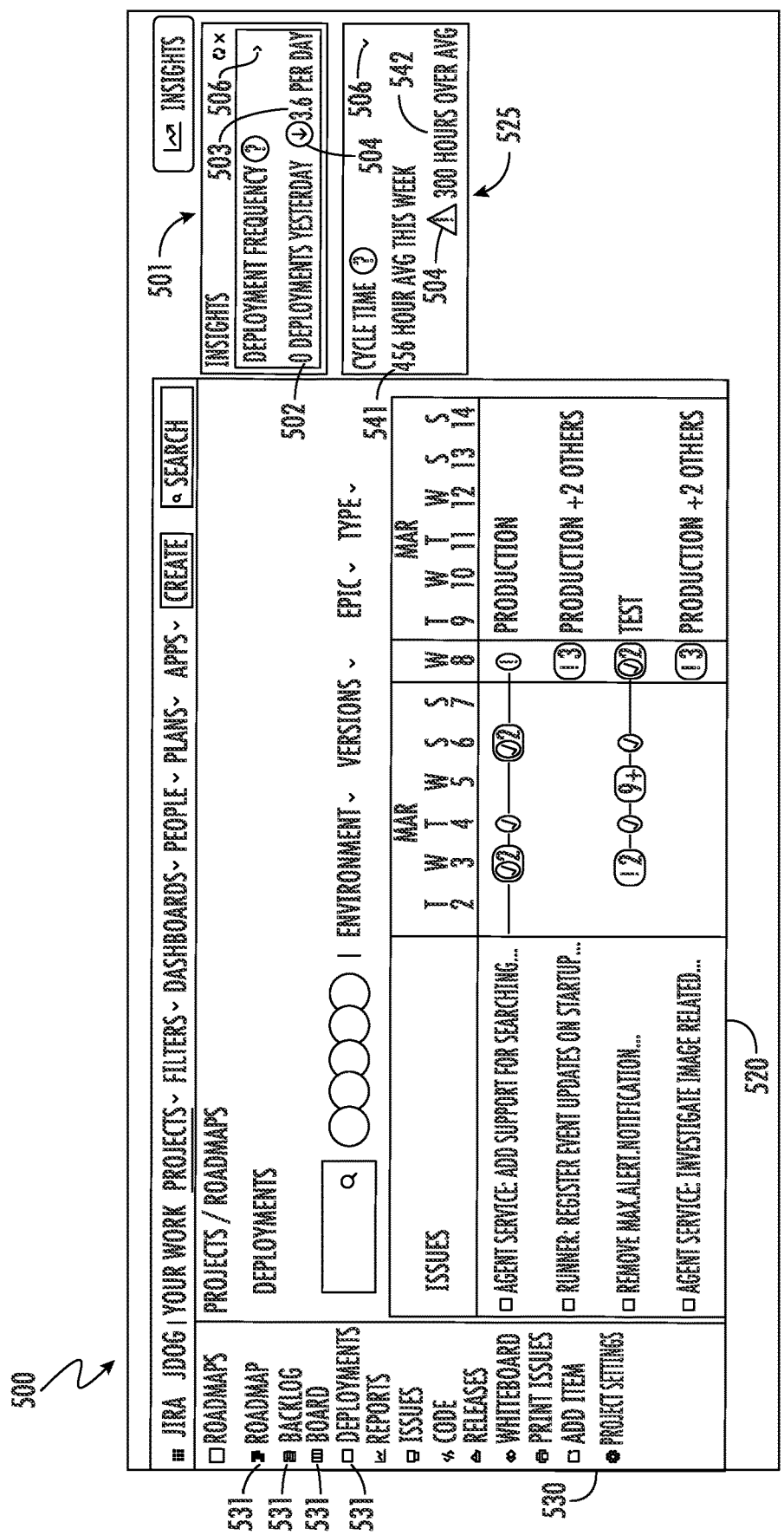
Figure 5B:
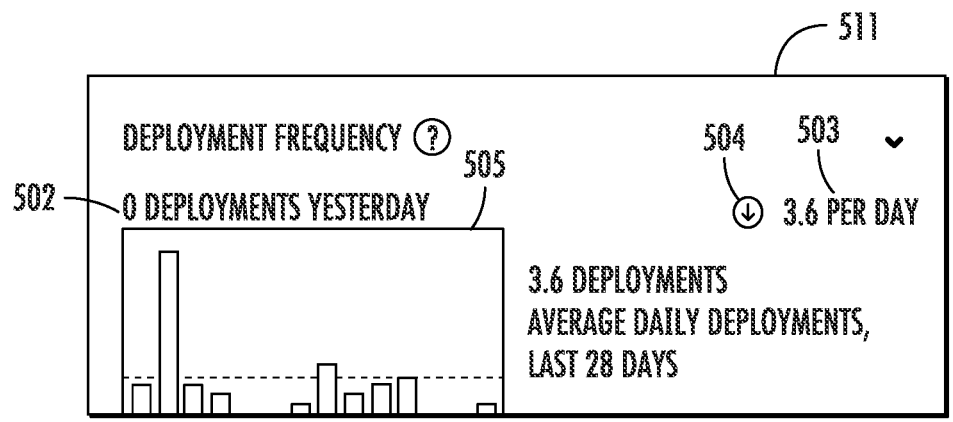
Figure 5C:
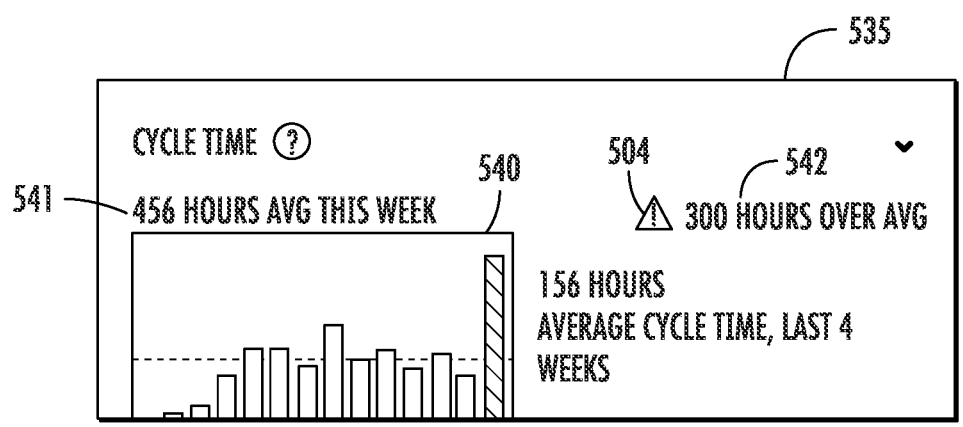
Figure 6A:
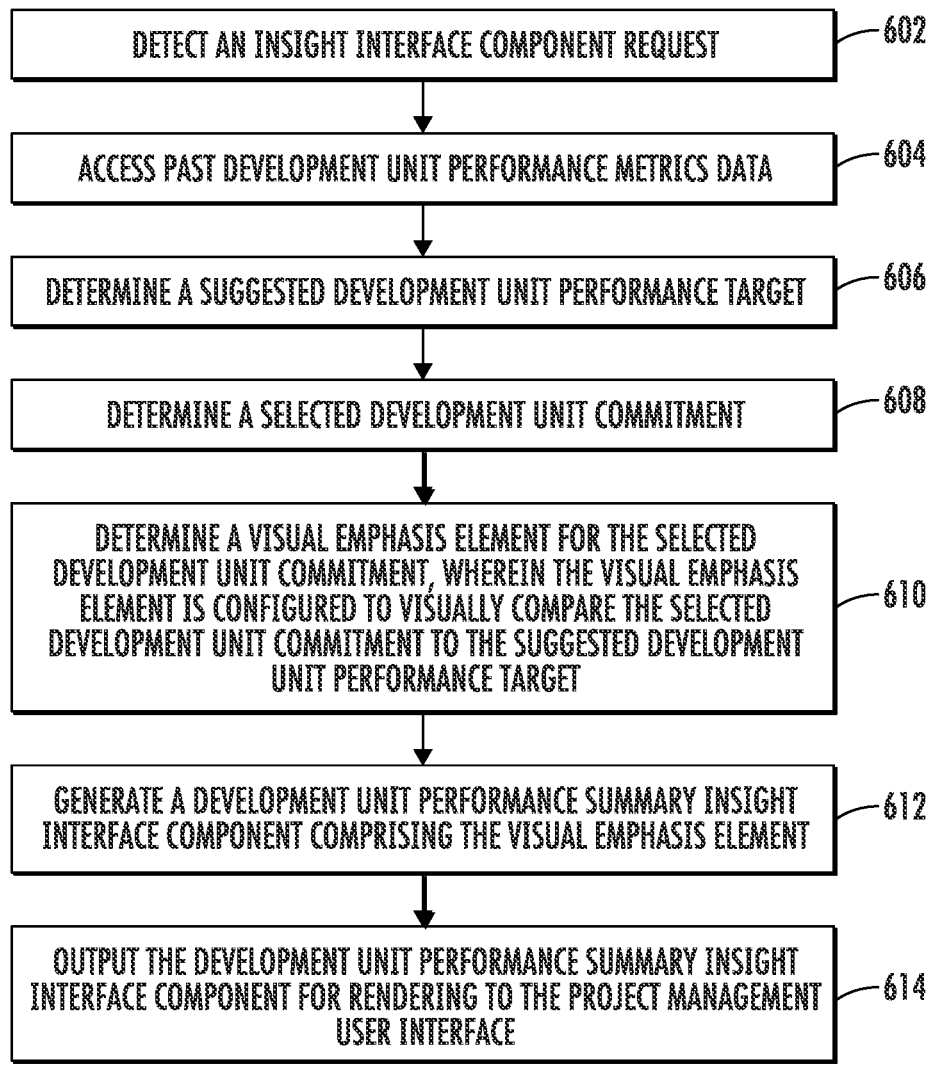
Figure 6B:
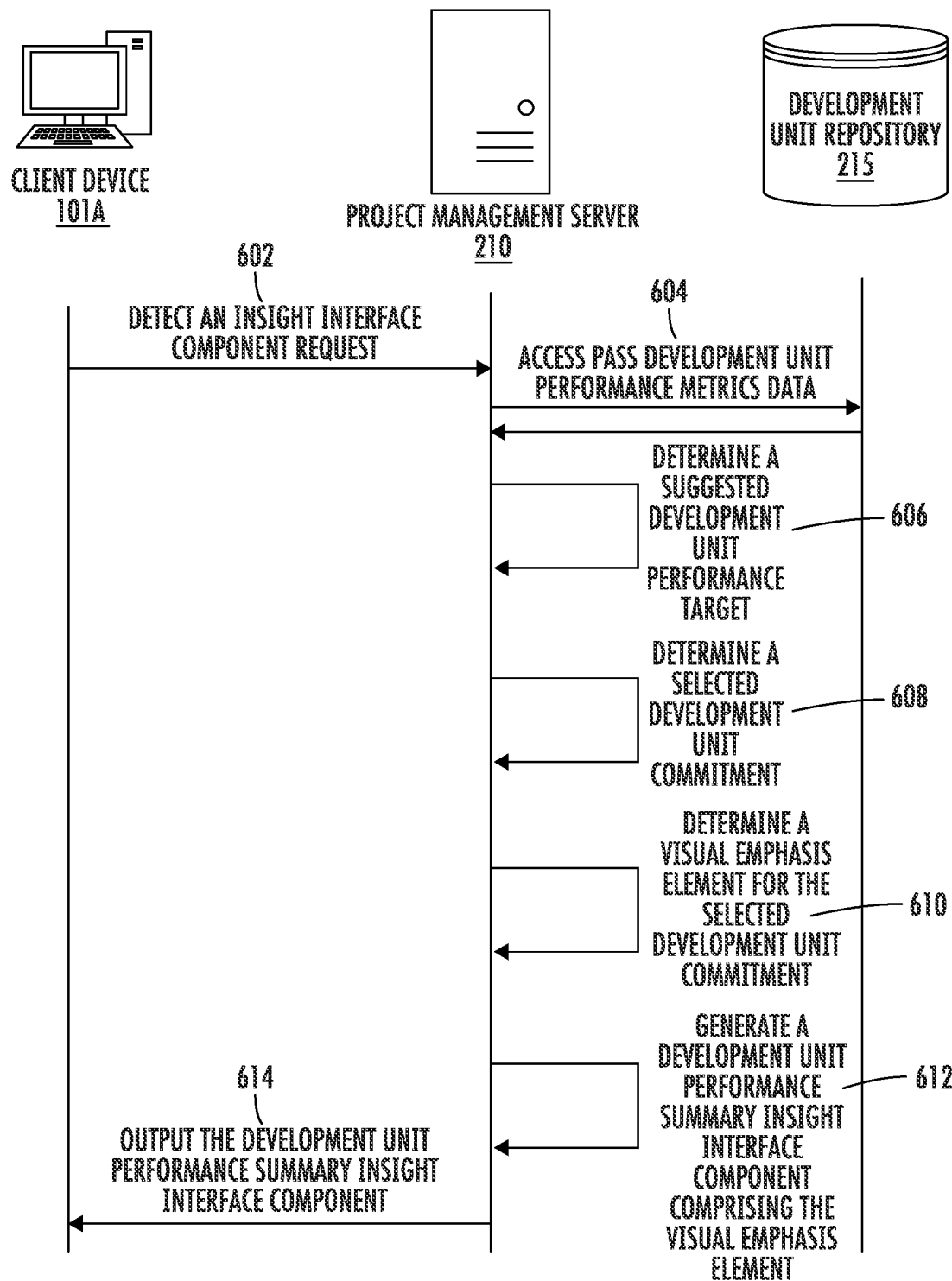
Figure 7:
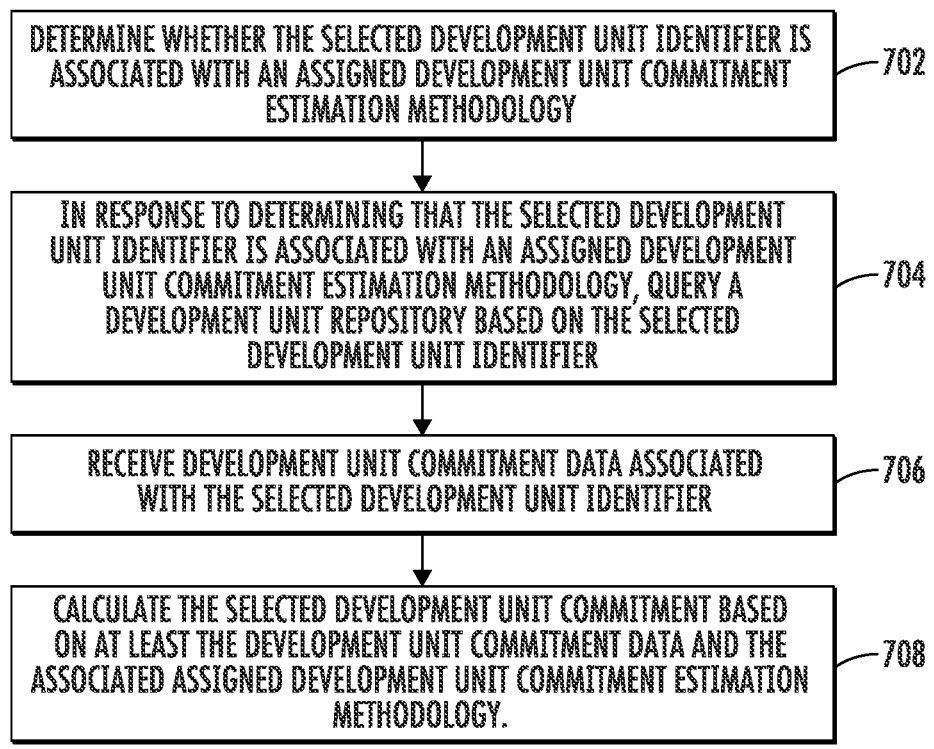

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates an example project management and collaboration system configured to communicate with various client devices in accordance with various example embodiments described herein;

FIG. 2 is a schematic block diagram of example circuitry to perform various operations in accordance with various embodiments of the subject disclosure;

FIG. 3A illustrates an example development unit performance summary insight interface component and an example issue type summary insight interface component associated with a backlog view of a project management user interface, the development unit performance summary insight interface component and issue type summary insight interface component each structured in accordance with example embodiments of the subject disclosure;

FIG. 3B illustrates another example development unit performance summary insight interface component and another example issue type summary insight interface component associated with a backlog view of a project management user interface, the development unit performance summary insight interface component and issue type summary insight interface component each structured in accordance with example embodiments of the subject disclosure;

FIG. 3C illustrates an example development unit performance detailed insight interface component structured in accordance with example embodiments of the subject disclosure;

FIG. 3D illustrates an example development unit performance detailed insight interface component with an informational interface component structured in accordance with example embodiments of the subject disclosure;

FIG. 3E illustrates an alternative example development unit performance detailed insight interface component structured in accordance with example embodiments of the subject disclosure;

FIG. 3F illustrates an example development unit performance detailed insight interface component with an informational interface component structured in accordance with example embodiments of the subject disclosure;

FIG. 3G illustrates an example issue type detailed insight interface component structured in accordance with example embodiments of the subject disclosure;

FIG. 3H illustrates an example issue type detailed insight interface component with an informational interface component structured in accordance with example embodiments of the subject disclosure;

FIG. 4A illustrates an example development unit performance summary insight interface component associated with a board view of a project management user interface, the development unit performance summary insight interface component structured in accordance with example embodiments of the subject disclosure;

FIG. 4B illustrates an example development unit performance detailed insight interface component structured in accordance with example embodiments of the subject disclosure;

FIG. 5A illustrates two example development unit performance summary insight interface components associated with a deployments view of a project management user interface, each of the development unit performance summary insight interface components structured in accordance with example embodiments of the subject disclosure;

FIG. 5B illustrates an example deployment frequency detailed insight interface component structured in accordance with example embodiments of the subject disclosure;

FIG. 5C illustrates an example cycle time detailed insight interface component structured in accordance with example embodiments of the subject disclosure;

FIG. 6A is a flowchart illustrating example operations for outputting a contextually relevant development unit performance insight interface component in accordance with various aspects and embodiments of the subject disclosure;

FIG. 6B is a signal diagram of an example data flow in accordance with various aspects and embodiments of the subject disclosure; and FIG. 7 is a flowchart illustrating example operations for determining the selected development unit commitment in accordance with various aspects and embodiments of the subject disclosure.

DETAILED DESCRIPTION

One or more embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to a server or client device as an example "apparatus." However, elements of the apparatus described herein may be equally applicable to the claimed system, method, and computer program product. Accordingly, use of any such terms should not be taken to limit the spirit and scope of embodiments of the present disclosure.

Overview

Methods, apparatuses, systems, and computer program products are provided in accordance with example embodiments of the present disclosure in order to address technical problems associated with generating and providing a contextually relevant development unit performance insight interface component in a project management and collaboration system in an efficient manner that reduces computational load and provides a low latency user experience. A project management and collaboration system (e.g., Jira® by Atlassian) enables a user or group of users to plan, track, organize, schedule, and/or otherwise manage one or more development projects.

As part of managing such projects in an agile project management system, for example, particularly software development projects, it is desirable to assign smaller sub-projects or work assignments in a de-centralized environment to one or more team members in a series of iterations to allow for continuous evaluation and improved response to unanticipated changes experienced during the development project as compared to a linear project. The resulting iterative outputs, products, and data resulting from the flexible nature of agile project management, however, are complex as they often not linear, consistent, or homogenous, and the data structures produced can be dissimilar across teams, scrums, sprints, and projects. Moreover, when team members are planning or scheduling such work assignments, there may be a tendency to overload (and, in some instances, underload) work assignments to team members, which ultimately results in the perception of under-delivery when not all work assignments are completed in the allotted iteration. Indeed, a misallocation or an improper work assignment projection is undesirable and may negatively affect the ultimate project deadline and the overall effectiveness of the collaborating development team. Moreover, because projects and sub-projects can be dependent on other projects and sub-projects, erroneous projections and delayed results in one may cause upstream or downstream difficulties for all, such as resource planning (e.g., developer and/or computer/ network resources, such as team members, code repositories, system assets, etc.) across multiple teams/projects.

Accordingly, the inventors have determined it would be desirable and advantageous to programmatically track and analyze performance metrics, monitor commitments, dynamically expose such assessments to a planning user in a contextually relevant way, and efficiently and effectively provide target commitment recommendation(s) to the planning user before the development of project(s) and sub-project(s), thereby enabling the planning user to assess the commitment status of a development unit and/or development team and adjust for more realistic project commitments in near real-time or real-time. The inventors have also determined it is desirable and advantageous to programmatically track, monitor, and analyze performance metrics and dynamically expose such assessments to a user in a contextually relevant way during the progression and at deployment of a project(s) or sub-project(s), thereby enabling the user to assess the current status and/or progress of a development unit in near real-time or real-time. Programmatically analyzing and dynamically providing performance metrics throughout the cycle of the project(s) or sub-project(s), such as deployment frequency and cycle time associated with delivering value from a project or sub-project, to the user are also desirable in order to ensure a project is on-time and continuing to deliver value.

Example embodiments of the present disclosure include detecting an insight interface component request (e.g., development unit summary insight component request), accessing past development unit performance metrics data, determining a suggested development unit performance target, determining a selected development unit commitment, determining a visual emphasis element for the selected development unit commitment, wherein the visual emphasis element is configured to visually compare the selected development unit commitment to the suggested development unit performance target, generating a development unit performance summary insight interface component comprising the visual emphasis element, and outputting the development unit performance summary insight interface component for rendering to a project management user interface.

Various benefits can be realized by enabling such an informed environment for managing project commitments. For example, in some embodiments, by programmatically determining and evaluating selected performance indicators of comparable development units (e.g., one or more previous sprints) against a proposed commitment for a selected development unit (e.g., a current or future sprint) and providing such actionable insight in a contextually relevant format (e.g., a sprint performance summary insight interface component or sprint performance detailed insight interface component accessible in a backlog view of a project management user interface), a planning user can adapt the scope of the development unit and realistically balance commitments during planning and/or progress of such selected development unit. The inventors have further determined that because the varied data outputted in an agile project management environment is not necessarily comparable nor are the key performance indicators necessarily selectable by a human, it would be advantageous to leverage artificial intelligence and train a machine learning model with such a dissimilar aggregate of data in order to determine at least the suggested development unit performance target, the machine learning model thereby informing the development unit performance insight interface component, in near real-time or real-time, to provide insight to the planning user and otherwise avoid or reduce the misallocation of resources. For illustration purposes, in a non-limiting example, during team planning for a new future sprint, it is advantageous for the team to be informed, in real-time, by an accurate, informed, clear and easy sprint performance metric insight interface component, of a realistic story-point commitment target for that team when assigning tasks/work items for the new sprint and be able to adjust the actual story-point commitment for the sprint accordingly. Providing such a clear and easy interface component is desirable as it allows the planning user to get a feel for actual available capacity, make informed development projections, and adjust for a realistic commitment accordingly. Enabling more realistic projected commitment metrics further advantageously improves resource planning, reduces the perception of under-delivery, and allows for better project deadline predictions.

In some further embodiments, an issue type insight component (e.g., an issue type summary insight component or an issue type detailed insight component) provides the further benefit of indicating a real-time or near real-time analysis of the type(s) of issues committed to the current development unit. The inventors have further determined that it would be advantageous to provide the planning user with such a breakdown so that the planning user can make an informed value determination of the issues being committed in real time. For illustration purposes, in a non-limiting example, during team planning for a new future sprint, it is advantageous for the planning user to be informed, in real-time, by an issue type insight component of the issue type commitment for the new sprint in order to minimize or avoid the team spending large amounts of time and effort on issues providing little to no value (e.g., tech debt and/or bugs) to the overall project deployment.

Example embodiments of the present disclosure address the various deficiencies set forth above and otherwise described herein, while also providing various technical benefits. For example, some embodiments of the present disclosure increase the efficiency and effectiveness of a project management and collaboration system itself. For example, the improved allocation of resources, including network and computer resources such as code repositories and other system assets, improves the efficiency of the project management and collaboration system. Moreover, it is undesirable to require the project management server to repeatedly capture and calculate performance metrics and/or commitments in order to provide the insight interface components in real-time or near-real time in response to a client device's request for such insight. The amount of system resources expended and time allocated to determining and providing such calculations is costly and is only exacerbated as the number of projects and complexity of requested metrics increase. Accordingly, some embodiments of the present disclosure reduce such network traffic and computing resource consumption by the project management server by calculating and caching the performance metrics and commitment data in aggregation and, alternatively or additionally, enabling the project management server to push relevant updates of the data aggregation to the local service on the client device. Such reduced network traffic and data processing amounts to increased security and less strain on the project management and collaboration system itself, leading to increased lifetime and efficiency of the system.

Moreover, the system's ability to display information and interact with the planning user is improved. To provide context, the planning user experiences lower latency due to the utilization of aggregated metrics and the optimization of computing source allocation. Additionally, technical challenges exist in providing such a low latency user experience such as accounting for different permissions or data access privileges of various team members on the same team. For example, certain project data, such as selected roadmap views and issues, may only be visible to supervisors and/or project managers of a team. In contrast, it is desirable for the development unit performance insight interface components to not only be visible to all team members, but also to be of the same view (e.g., persistent across various permission levels). Example embodiments of the present disclosure address the technical challenges of such permissions levels. As such, systems structured in accordance with various embodiments of the present disclosure may reduce computing resource consumption and provide specific, technical solutions to technical problems faced by existing systems, the details of which are described hereafter.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" and similar terms refer to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "project management and collaboration system" refers to the software platform(s) and associated hardware that is configured to support and maintain a plurality of projects, workflows, and all associated functionality. Example project management and collaboration systems comprise supporting servers and client devices, and in some embodiments, are further configured to engage with external resources and external applications.

The term "project management server" refers to a software platform and associated hardware that is configured to manage the various development unit performance insight interface components and associated functionality of the project management and collaboration system. The project management server is accessible via one or more computing devices, is configured to receive various requests (e.g., insight interface component request(s), development unit performance summary insight interface component request(s), development unit performance detailed insight interface component request(s), and/or the like), and access one or more data repositories such as a development unit repository. The functionality of the project management server may be provided via a single server or collection of servers having a common functionality, or the functionality of the project management server may be segmented among a plurality of servers or collections of servers (e.g., microservices) performing subsets of the described functionality of the project management server.

The term "project management user interface" refers to a graphical user interface of a project management and collaboration system that is configured to enable users to view and engage with one or more project management workspaces. A project management user interface is rendered to a client device based on data and instructions provided by the project management and collaboration system (e.g., project management server). In some embodiments, such data and instructions are facilitated by a dedicated software application running on the client device. In other embodiments, such data and instructions are provided through a web browser running on the client device. Non-limiting examples of a project management user interface include a backlog view interface associated with planning a future development unit, a board view interface associated with an ongoing or active development unit, a deployments view interface associated with tracking of completed or deployed development units, and a road maps view interface associated with tracking development units and progress across multiple teams.

The terms "project management application" or "project management app" refer to a dedicated software program, application, platform, service, web browser, or computer-executable application software programmed or configured to run on a client device which provides the user (e.g., a planning user) access to the project management and collaboration system and its associated functionality. In some embodiments, the project management application may include hardware, software, or combinations thereof operating remotely (e.g., on a server). In some embodiments, the project management application is designed to execute on mobile devices, such as tablets or smartphones. For example, in certain embodiments, an app is provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

The term "development unit" refers to a fundamental work development component, part, event and the like in a project development cycle within a project management and collaboration system. In some embodiments, a development unit comprises one or more smaller development units or increments. For example, to provide context, a large development unit, such as a project, is delivered in one or more small increments, such as sprint(s). Non-limiting examples of a development unit include a project, a sprint, a user story, an epic, an issue, a task, a work item, a work unit (e.g., a unit or version of code), an iteration, a Kanban, and/or the like.

As used herein, the term "development unit identifier" refers to one or more items of data by which a development unit may be uniquely identified within a project management and collaboration system. For example, a development unit identifier may comprise one or more of ASCII text, encryption keys, identification certificates, a pointer, an IP address, a URL, a MAC address, a memory address, or other unique identifier, or combinations thereof.

As used herein, the term "development unit status identifier" refers to one or more items of data by which the current status (e.g., future, active, past and the like) of a development unit is identified within a project management and collaboration system.

The terms "project identifier" or "project ID" refer to one or more items of data by which a project, such as a stored software development project, may be uniquely identified within a project management and collaboration system. For example, a project identifier may comprise one or more of ASCII text, encryption keys, identification certificates, a pointer, an IP address, a URL, a MAC address, a memory address, or other unique identifier, or combinations thereof. In a non-limiting example, one or more development unit identifiers, one or more team member identifiers, and one or more team identifiers are associated with a selected project identifier.

As used herein, the term "user identifier" refers to one or more items of data by which a user may be uniquely identified within a project management and collaboration system. For example, a user identifier may comprise one or more of American Standard Code for Information Interchange (ASCII) text, encryption keys, identification certificates, a pointer, an Internet Protocol (IP) address, a URL, a MAC address, a memory address, or other unique identifier, or combinations thereof.

The terms "team identifier" or "team ID" refer to one or more items of data by which a team comprising one or more team members may be uniquely identified within a project management and collaboration system. For example, a project identifier may comprise one or more of ASCII text, encryption keys, identification certificates, a pointer, an IP address, a URL, a MAC address, a memory address, or other unique identifier, or combinations.

The terms "team member identifier" or "team member ID" refer to one or more items of data by which a team member may be uniquely identified within a project management and collaboration system. For example, a project identifier may comprise one or more of ASCII text, encryption keys, identification certificates, a pointer, an IP address, a URL, a MAC address, a memory address, or other unique identifier, or combinations.

The terms "customer identifier" or "customer ID" refer to one or more items of data by which a project customer may be uniquely identified within a project management and collaboration system. For example, a customer identifier may comprise one or more of ASCII text, encryption keys, identification certificates, a pointer, an IP address, a URL, a MAC address, a memory address, or other unique identifier, or combinations thereof.

The term "development unit performance insight interface component" refers to a user interface element that is rendered to, or as a portion of, a project management user interface in a project management and collaboration system and is configured to display performance metrics information associated with a selected development unit. In some embodiments, a development unit performance insight interface component is configured to be displayed in association with the planning of a future development unit (e.g., in association with a backlog view of a project management user interface). For example, in some embodiments, the development unit performance insight interface component comprises a development unit commitment of the selected development unit in a planning phase. In some further embodiments, the development unit performance insight interface component associated with the planning of a future development unit comprises a suggested development unit performance target for the selected development unit. In still further embodiments, the development unit performance insight interface component comprises a visual emphasis element (e.g., coloring scheme, visual intensity, sizing scheme, and/or the like) configured to visually compare the selected development unit commitment to the suggested development unit performance target.

In other embodiments, a development unit performance insight interface component is configured to be displayed in association with an ongoing or active development unit (e.g., in association with a board view of a project management user interface). For example, in some embodiments, the development unit performance insight interface component comprises a completion progress status displaying the current progress status (e.g., commitment completion percentage measurement) of the selected development unit. In some further embodiments, the completion progress status is configured to be displayed in one or more ways, such as alphanumerically and/or via a visual progress status indicator component to visually depict (e.g., horizontal status bar(s), vertical status bar(s), pie chart, line chart, radial column chart, donut chart, icons, bubble chart, etc.) the completion progress status. Such examples are for purposes of illustration and not of limitation and other suitable variations of depicting the commitment completion percentage measurement(s) are also contemplated by this disclosure as will be apparent to one of ordinary skill in the art.

In still other embodiments, a development unit performance insight interface component is configured to be displayed in association with tracking the deployment of development unit(s) (e.g., in association with a deployments view of a project management user interface) through a complete cycle to deployment (e.g., non-production deployment, production deployment, release, etc.). For example, in some embodiments, a development unit comprises a selected version or unit of code and the development unit performance insight interface component comprises deployment metrics information associated with a selected team identifier and/or project identifier. In some embodiments, the development unit performance insight interface component comprises a total number of deployments associated with a selected period of time (e.g., daily, weekly, monthly, etc.) and a corresponding calculated deployment frequency (e.g., average daily deployments, average weekly deployments, average monthly deployments, etc.) at which the associated team identifier and/or project identifier are deploying development units. In some embodiments, such a development unit performance insight interface component is a "deployment frequency insight interface component."

Another embodiment of a development unit performance insight interface component configured to be displayed in association with the tracking of deployments (e.g., in association with a deployments view of a project management user interface) is a development unit performance insight interface component comprising a calculated average cycle time (e.g., hours of work) associated with the progression of development unit(s) from commitment to deployment and a corresponding calculated cycle time average (e.g., average cycle time in hours over last four weeks, etc.) for the associated team identifier and/or project identifier. In some embodiments, such a development unit performance insight interface component is a "cycle time insight interface component."

In some embodiments, the development unit performance insight interface component is configured to display one or more levels of information. For example, FIGS. 3A and 3B each illustrate an example embodiment (e.g., sprint performance summary insight interface) of a development unit performance summary insight interface component 301 exposing a first or summary level of information in association with a planning phase of the development unit (e.g., a backlog view). Similarly, FIG. 4A illustrates an example embodiment (e.g., sprint performance summary insight interface component) of a development unit performance summary insight interface component 401 exposing a first or summary level of information in association with an active development unit (e.g., a board view). Similarly, FIG. 5A illustrates example embodiments (e.g., a deployment frequency summary insight interface component 501 and a cycle time summary insight interface component 525) of a development unit performance summary insight interface component exposing a first or summary level of information in association with a deployments view of the project management user interface. FIGS. 3C-3F each illustrate an example embodiment (e.g., sprint performance detailed insight interface) of a development unit performance detailed insight interface component 311 exposing a second or detailed level of information. Similarly, FIG. 4B illustrates an example embodiment (e.g., sprint performance detailed insight interface) of a development unit performance detailed insight interface component 411 exposing a second or detailed level of information. Similarly, FIGS. 5B and 5C each illustrate an example embodiment (e.g., a deployment frequency detailed insight interface component 511 and a cycle time detailed insight interface component 535) of a development unit performance detailed insight interface component exposing a second or detailed level of information in association with a deployments view of the project management user interface The term "insight interface component request" refers to an electrically generated digital object created by a computing device that indicates that a user (e.g., a planning user) has provided an input comprising a request to generate and display one or more insight interface components. For example, in some embodiments, an insight interface component request comprises one or more of a development unit performance summary insight interface component request, a development unit performance detailed insight component request, an issue type summary insight interface component request, an issue type detailed summary insight interface component request, a development frequency summary insight component request, a development frequency detailed insight component request, a cycle time summary insight component request, and a cycle time detailed insight component request.

The term "development unit performance summary insight interface component request" refers to an electrically generated digital object created by a computing device that indicates that a user (e.g., a planning user) has provided an input comprising a request to generate and display a development unit performance summary insight interface component. In some embodiments, the development unit performance summary insight interface component request is associated with a development unit identifier, a user identifier, a team identifier, a project identifier and/or the like. A development unit performance summary insight interface component request may be represented via a temporary code that notifies a recipient (e.g., a server) that a user (e.g., a planning user) has made the request. To provide further context, a development unit performance summary insight interface component request is generated in response to a user interaction with a computing device wherein a user causes the computing device to generate a development unit performance summary insight interface component request. For example, in some embodiments, the planning user interacts with, for example, a specific development unit performance summary insight actuator button (e.g., "Insights" or "Show Insights") rendered on a visual display of the computing device. In other embodiments, the user interacts with (e.g., hover user interaction), for example, a defined region of the project management user interface activating the request (e.g., a user hovers in a sidebar region of the project management user interface for a threshold amount of time). In another exemplary embodiment, the planning user interacts with a create development unit actuator button (e.g., "Create Sprint"), wherein such user interaction generates the development unit performance summary insight interface component request in association with a create development unit request.

The term "development unit performance detailed insight interface component request" refers to an electrically generated digital object created by a computing device that indicates that a user (e.g., a planning user) has provided an input comprising a request to generate and display a development unit performance detailed insight interface component. In some embodiments, the development unit performance detailed insight interface component request is associated with a development unit identifier, a user identifier, a team identifier, a project identifier and/or the like. A development unit performance detailed insight interface component request may be represented via a temporary code that notifies a recipient (e.g., a server) that a user (e.g., a planning user) has made the request. To provide further context, a development unit performance detailed insight interface component request is generated in response to a user interaction with a computing device wherein a user causes the computing device to generate a development unit performance detailed insight interface component request. For example, in some embodiments, the user interacts with, for example, a specific development unit performance detailed insight actuator button (e.g., ">", "More", "Detail", and the like) rendered on a visual display of the computing device (e.g., rendered as part of a development unit performance summary insight interface component.

The term "issue type summary insight interface component request" refers to an electrically generated digital object created by a computing device that indicates that a user (e.g., a planning user) has provided an input comprising a request to generate and display an issue type summary insight interface component. In some embodiments, the issue type summary insight interface component request is associated with a development unit identifier, a user identifier, a team identifier, a project identifier and/or the like. An issue type summary insight interface component may be represented via a temporary code that notifies a recipient (e.g., a server) that a user (e.g., a planning user) has made the request. To provide further context, an issue type summary insight interface component is generated in response to a user interaction with a computing device wherein a user causes the computing device to generate an issue type summary insight interface component For example, in some embodiments, the planning user interacts with, for example, a specific insight actuator button (e.g., "Insights" or "Show Insights") rendered on a visual display of the computing device. In other embodiments, the user interacts with (e.g., hover user interaction), for example, a defined region of the project management user interface activating the request (e.g., a user hovers in a sidebar region of the project management user interface for a threshold amount of time). In another exemplary embodiment, the planning user interacts with a create development unit actuator button (e.g., "Create Sprint"), wherein such user interaction generates issue type summary insight interface component in association with a create development unit request.

The term "issue type detailed insight interface component request" refers to an electrically generated digital object created by a computing device that indicates that a user (e.g., a planning user) has provided an input comprising a request to generate and display an issue type detailed insight interface component. In some embodiments, an issue type detailed insight interface component request is associated with a development unit identifier, a user identifier, a team identifier, a project identifier and/or the like. An issue type detailed insight interface component request may be represented via a temporary code that notifies a recipient (e.g., a server) that a user (e.g., a planning user) has made the request. To provide further context, an issue type detailed insight interface component request is generated in response to a user interaction with a computing device wherein a user causes the computing device to generate an issue type detailed insight interface component request. For example, in some embodiments, the user interacts with, for example, a specific issue type detailed insight actuator button (e.g., ">", "More", "Detail", and the like) rendered on a visual display of the computing device (e.g., rendered as part of an issue type summary insight interface component).

The term "deployment frequency summary insight interface component request" refers to an electrically generated digital object created by a computing device that indicates that a user (e.g., a planning user) has provided an input comprising a request to generate and display a deployment frequency summary insight interface component. In some embodiments, the deployment frequency summary insight interface component request is associated with a development unit identifier, a user identifier, a team identifier, a project identifier and/or the like. In some embodiments, a deployment frequency summary insight interface component is represented via a temporary code that notifies a recipient (e.g., a server) that a user (e.g., a planning user) has made the request. To provide further context, a deployment frequency summary insight interface component is generated in response to a user interaction with a computing device wherein a user causes the computing device to generate a deployment frequency summary insight interface component For example, in some embodiments, the planning user interacts with, for example, a specific insight actuator button (e.g., "Insights" or "Show Insights") rendered on a visual display of the computing device, such as associated with a Developments view of a project management user interface. In other embodiments, the user interacts with (e.g., hover user interaction), for example, a defined region of the project management user interface activating the request (e.g., a user hovers in a sidebar region of the project management user interface for a threshold amount of time).

The term "deployment frequency detailed insight interface component request" refers to an electrically generated digital object created by a computing device that indicates that a user (e.g., a planning user) has provided an input comprising a request to generate and display a deployment frequency detailed insight interface component. In some embodiments, a deployment frequency detailed insight interface component request is associated with a development unit identifier, a user identifier, a team identifier, a project identifier and/or the like. In some embodiments, a deployment frequency detailed insight interface component request is represented via a temporary code that notifies a recipient (e.g., a server) that a user (e.g., a planning user) has made the request. To provide further context, a deployment frequency detailed insight interface component request is generated in response to a user interaction with a computing device wherein a user causes the computing device to generate a deployment frequency detailed insight interface component request. For example, in some embodiments, the user interacts with, for example, a specific development frequency detailed insight actuator button (e.g., ">", "More", "Detail", and the like) rendered on a visual display of the computing device (e.g., rendered as part of a deployment frequency summary insight interface component).

The term "cycle time summary insight interface component request" refers to an electrically generated digital object created by a computing device that indicates that a user (e.g., a planning user) has provided an input comprising a request to generate and display a cycle time summary insight interface component. In some embodiments, the cycle time summary insight interface component request is associated with a development unit identifier, a user identifier, a team identifier, a project identifier and/or the like. In some embodiments, a cycle time summary insight interface component is represented via a temporary code that notifies a recipient (e.g., a server) that a user (e.g., a planning user) has made the request. To provide further context, a cycle time summary insight interface component is generated in response to a user interaction with a computing device wherein a user causes the computing device to generate a cycle time summary insight interface component For example, in some embodiments, the planning user interacts with, for example, a specific insight actuator button (e.g., "Insights" or "Show Insights") rendered on a visual display of the computing device, such as associated with a Developments view of a project management user interface. In other embodiments, the user interacts with (e.g., hover user interaction), for example, a defined region of the project management user interface activating the request (e.g., a user hovers in a sidebar region of the project management user interface for a threshold amount of time).

The term "cycle time detailed insight interface component request" refers to an electrically generated digital object created by a computing device that indicates that a user (e.g., a planning user) has provided an input comprising a request to generate and display a cycle time detailed insight interface component. In some embodiments, a cycle time frequency detailed insight interface component request is associated with a development unit identifier, a user identifier, a team identifier, a project identifier and/or the like. In some embodiments, a cycle time frequency detailed insight interface component request is represented via a temporary code that notifies a recipient (e.g., a server) that a user (e.g., a planning user) has made the request. To provide further context, a cycle time frequency detailed insight interface component request is generated in response to a user interaction with a computing device wherein a user causes the computing device to generate a cycle time frequency detailed insight interface component request. For example, in some embodiments, the user interacts with, for example, a specific development frequency detailed insight actuator button (e.g., ">", "More", "Detail", and the like) rendered on a visual display of the computing device (e.g., rendered as part of a cycle time frequency summary insight interface component).

The term "past development unit performance metrics data" refers to a variety of performance metric data associated with historical or past development units. In some embodiments, the past development unit performance metrics data is configured to provide an indication of the projected work effort (e.g., the intended commitment as assigned) of the past development unit and an indication of the completed work effort (e.g., the actual work completed) of the development unit. In some examples, the past development unit performance metrics data may be obtained and/or otherwise stored at the conclusion or completion of the past development unit. In other embodiments, the past development unit performance metrics data is obtained and/or stored during the occurrence of the past development unit.

The term "visual emphasis element" refers to a visual representation in a graphical user interface configured to visually convey information to the user. For example, in some embodiments, a visual emphasis element visually compares a selected development unit commitment to a suggested development unit performance target. To provide context, a visual emphasis element may be determined using various embodiments described herein, such as an analysis of a selected development unit commitment and a suggested development unit performance target. Examples of visual representation associated with a visual emphasis element include, but are not limited to, an icon, text, and/or background displayed in a graphical user interface. For example, in a non-limiting illustration, a visual emphasis element for a selected development unit commitment may comprise text in orange, an orange icon (e.g., an arrow or other indication of overload or overcommitment), and/or an orange background shading to indicate that the current level of commitment associated with the selected development unit (e.g., sprint) may be too much for the selected development unit. In a further example, a visual emphasis element for a selected development unit commitment may comprise text in green, a green icon (e.g., a thumbs up, a checkmark, or other indication of sufficient commitment, etc.), and/or a green background shading to indicate that the current level of commitment associated with the selected development unit is adequate, sufficient, or otherwise on target with the suggested development unit performance target. In another example, a visual emphasis element for a selected development unit commitment may comprise text in blue, a blue icon (e.g., an arrow or other indication of underload or under-commitment), and/or a blue background shading to indicate that there is capacity for additional commitment(s) to the selected development unit. Additional examples of visual emphasis elements include emphasizing an icon or text displayed on a graphical user interface (e.g., coloring scheme, highlighted, bolded, italicized, enlarged, shaded, flashing, pulsing, or changing in size, etc.). Additional examples of visual emphasis elements include numerous embodiments described herein, and would be understood to include any other visual indicators in light of the present disclosure.

The term "development unit commitment estimation methodology" refers to a methodology for estimating a relative effort of work associated with a development unit. Non-limiting examples of development unit commitment estimation methodologies include story point-based estimation methodology, time-based estimation methodology, issue count-based estimation methodology, and user-customized estimation methodology. An "assigned development unit commitment estimation methodology" refers to one or more development unit commitment estimation methodology(ies) that has been enabled or populated for a selected development unit. To provide context, in a non-limiting illustration, in an instance wherein an entry field corresponding to estimated story points has been populated in the creation and/or revision of a task, the assigned development unit commitment estimation methodology for that development unit is story point-based estimation methodology.

The term "issue type insight interface component" refers to a user interface element that is rendered to, or as a portion of, a project management user interface in a project management and collaboration system and is configured to display issue type metrics information associated with a selected development unit. In some embodiments, an issue type insight interface component is configured to be displayed in association with the planning of a future development unit (e.g., in association with a backlog view of a project management user interface). For example, in some embodiments, the issue type insight interface component comprises one or more issue type commitments of the selected development unit. In some embodiments, the issue type insight interface component is configured to display one or more levels of information. An "issue type summary insight interface component" is configured to display or expose a first or summary level of information. For example, in certain embodiments, the issue type summary insight interface component displays the issue type associated with the largest or greatest portion of the development unit commitment of the selected development unit in a planning phase. In some further embodiments, an "issue type detailed insight interface component" is configured to display or expose a second or detailed level of information. For example, in certain embodiments, the issue type detailed insight interface component displays the one or more issue type(s) comprising the development unit commitment of the selected development unit in a planning phase. In some further embodiments, the issue type detailed insight interface component is configured to display the relative commitment of each of the one or more issue type(s) in comparison to the other one or more issue type(s). In still further embodiments, the relative commitments of each of the one or more issue type(s) of the issue type detailed insight interface component is configured to be displayed in one or more ways, such as alphanumerically and/or via a visual status icon to visually depict (e.g., horizontal status bar(s), vertical status bar(s), pie chart, line chart, radial column chart, donut chart, icons, bubble chart, etc.) the relative commitment associated with each issue type.

The term "informational interface component" refers to a user interface element that is rendered to, or as a portion of, a project management user interface in a project management and collaboration system and is configured to display additional information associated with an insight component. For example, in some embodiments, an informational interface component is configured to be rendered to a project user management user interface in association with a selected insight component when a hover user interaction is detected in association with the selected insight component or a portion of the selected insight component. An informational interface component is configured to be rendered to a project user management user interface in association with a selected insight component or a portion of the selected insight component in association with other types of user interactions (e.g., user selection or clicking on a portion of the insight component. For example, as depicted in FIG. 3D, in response to detecting a hover user interaction by the planning user (e.g., detecting pointer) in association with the vertical element, additional information associated with the insight component (e.g., selected past development unit performance metrics data such as development unit title, total development unit commitment estimate value, total development unit completion value, a commitment completion percentage, and/or the like) is rendered via an informational interface component 310. Similarly, as depicted in FIG. 3H, in response to detecting a hover user interaction by the user in association with the horizontal issue type bar of the story issue type, additional information associated with the insight component (e.g., total number of issues of the selected issue type, overall percentage of the selected issue type, and/or the like) is rendered via an informational interface component 310.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Example System Architecture

Methods, apparatus, and computer program products of the present disclosure may be embodied by any of a variety of computing devices. For example, the method, apparatus, and computer program product of an example embodiment may be embodied by a networked device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. User(s) (e.g., planning user) may access a project management and collaboration system 200 via a communications network 102 using one or more of client devices 101A-101N. Project management and collaboration system 200 may comprise a project management server 210 in communication with at least one repository, such as development unit repository 215 and/or team member repository 220. Such repository(ies) may be hosted by the project management server 210 or otherwise hosted by devices in communication with the project management server 210.

Project management server 210 may include circuitry, networked processors, or the like configured to perform some or all of the project management server-based processes described herein, and may be any suitable network server and/or other type of processing device. In some embodiments, project management server 210 may determine and transmit commands and instructions for rendering one or more project management user interfaces to client devices 101A-101N, using data from, for example, development unit repository 215 and/or team member repository 220. In this regard, the project management server 210 may be embodied by any of a variety of devices, for example, the project management server 210 may be embodied as a computer or a plurality of computers. For example, project management server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, project management server 210 may be located remotely from the development unit repository 215 and/or team member repository 220, although in other embodiments, the project management server 210 may comprise the development unit repository 215 and/or team member repository 220. The project management server 210 may, in some embodiments, comprise several servers or computing devices performing interconnected and/or distributed functions. Despite the many arrangements contemplated herein, project management server 210 is shown and described herein as a single computing device to avoid unnecessarily overcomplicating the disclosure.

Project management server 210 can communicate with one or more client devices 101A-101N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the project management and collaboration system 200.

Development unit repository 215 may be stored by any suitable storage device configured to store some or all of the information described herein (e.g., memory 201 of the project management server 210 or a separate memory system separate from the project management server 210, such as one or more database systems, backend data servers, network databases, cloud storage devices, or the like provided by another device (e.g., online application or 3rd party provider), such as a Network Attached Storage (NAS) device or devices, or as a separate database server or servers. Development unit repository 215 may comprise data received from the project management server 210 (e.g., via a memory 201 and/or processor(s) 202), and the corresponding storage device may thus store this data. Development unit repository 215 includes information accessed and stored by the project management server 210 to facilitate the operations of the project management and collaboration system 200. As such, development unit repository 215 may include, for example, without limitation, user identifiers, team member identifiers, team identifiers, project identifiers, development unit identifiers, past development unit performance metrics data, development unit commitment data, and the like.

Team member repository 220 may be stored by any suitable storage device configured to store some or all of the information described herein (e.g., memory 201 of the project management server 210 or a separate memory system separate from the project management server 210, such as one or more database systems, backend data servers, network databases, cloud storage devices, or the like provided by another device (e.g., online application or 3rd party provider), such as a Network Attached Storage (NAS) device or devices, or as a separate database server or servers. Team member repository 220 may comprise data received from the project management server 210 (e.g., via a memory 201 and/or processor(s) 202), and the corresponding storage device may thus store this data. Team member repository 220 includes information accessed and stored by the project management server 210 to facilitate the operations of the project management and collaboration system 200. As such, team member repository 220 may include, for example, without limitation, user identifiers, team member identifiers, team identifiers, team member data, team workload value (e.g., a team's total current workload), team member workload value (e.g., a team member's total current workload across all projects/teams), team member skillset value, team member experience value (e.g., years of experience), and/or the like, The client devices 101A-101N may be implemented as any computing device as defined above. Electronic data received by the project management server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the project management user interface to a user (e.g., planning user) and otherwise providing access to the project management and collaboration system 200. The depiction in FIG. 2 of "N" client devices is merely for illustration purposes. According to some embodiments, the client devices 101A-101N may be configured to display an interface on a display of the client device for viewing, creating, editing, and/or otherwise interacting with at least one project management user interface, which may be provided by the project management and collaboration system 200. According to further embodiments, the client devices 101A-101N may be configured to generate and/or display a development unit performance summary insight interface component, a development unit performance detailed insight interface component, and/or the like.

In embodiments where a client device 101A-101N is a mobile device, such as a smartphone or tablet, the client device 101A-101N may execute an "app" to interact with the project management and collaboration system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the project management and collaboration system 200 via a web browser. As yet another example, the client devices 101A-101N may include various hardware or firmware designed to interface with the project management and collaboration system 200.

Example Apparatus for Implementing Embodiments of the Present Disclosure

FIG. 2 shows a schematic block diagram of an example circuitry 225, some or all of which may be included in project management server 210 or client device(s) 101A-101N. In accordance with some example embodiments, circuitry 225 may include various means, such as memory 201, processor 202, input/output circuitry 203, and/or communications circuitry 204. In some embodiments, such as when circuitry 225 is included in project management server 210 or client device 101A, development insight circuitry 205 may also or instead be included. For example, where development insight circuitry 205 is included with client device 101A, the circuitry may be configured to facilitate the functionality discussed herein regarding generating development unit performance insight interface component(s) and/or the like. In another example, where development insight circuitry 205 is included with project management server 210, the circuitry may be configured to process the associated commitment data in order to generate development unit performance insight interface component(s) and/or an updated selected development unit commitment. An apparatus, such as project management server 210 or client device(s) 101A-101N, may be configured, using one or more of the circuitry 201, 202, 203, 204, and 205, to execute the operations described above with respect to FIG. 1 and below in connection with FIGS. 3A-7.

Although the use of the term "circuitry" as used herein with respect to components 201-205 are described in some cases with respect to functional limitations, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry.

The term "circuitry" should also be understood, in some embodiments, to include software for configuring the hardware. For example, in some embodiments, "circuitry" may include processing circuitry, storage media, network interfaces, input/output devices, and the like. In some embodiments, such as in examples where circuitry 225 is included with project management server 210, other elements of the project management server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, project management server 210. The memory 201 is non-transitory and may include, for example, one or more volatile and/or non-volatile memories, or some combination thereof. In other words, for example, the memory 201 may be an electronic storage device (e.g., a computer readable storage medium). The memory 201 may be configured to store information, data, content, applications, instructions, or the like, for enabling an apparatus, e.g., project management server 210 to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling circuitry 225 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by circuitry 225 during the course of performing its functionalities.

Processor 202 may be embodied in a number of different ways and may, for example, include one or more processing devices configured to perform independently. Additionally or alternatively, processor 202 may include one or more processors configured in tandem via a bus to enable independent execution of instructions, pipelining, and/or multi-threading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as circuitry 225 (e.g., project management server 210). The plurality of processors may be in operative communication with each other and may be collectively configured to perform one or more functionalities of circuitry 225 as described herein.

In an example embodiment, processor 202 is configured to execute instructions stored in the memory 201 or otherwise accessible to processor 202. Alternatively or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause project management server 210 to perform one or more of the functionalities of project management server 210 as described herein.

In some embodiments, input/output circuitry 203 may, in turn, be in communication with processor 202 to provide an audible, visual, mechanical, or other output and/or, in some embodiments, to receive an indication of an input. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface (e.g., a project management user interface, a development unit performance summary insight interface component, a development unit performance detailed insight interface component etc.) and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In embodiments where circuitry 225 may be implemented as a project management server 210, as shown in FIG. 2, aspects of input/output circuitry 203 may be reduced as compared to embodiments where circuitry 225 may be implemented as an end-user machine or other type of device designed for complex user interactions (i.e., client device 101). In some embodiments (like other components discussed herein), input/output circuitry 203 may even be eliminated from circuitry 225. Alternatively, such as in embodiments wherein circuitry 225 is embodied as project management server 210, at least some aspects of input/output circuitry 203 may be embodied on an apparatus used by a planning user that is in communication with circuitry 225. Input/output circuitry 203 may be in communication with memory 201, communications circuitry 204, and/or any other component(s), such as via a bus. Although more than one input/output circuitry and/or other component can be included in circuitry 225, only one is shown in FIG. 2 to avoid overcomplicating the disclosure (e.g., like the other components discussed herein).

Communications circuitry 204 may be any means such as a device or circuitry embodied in either hardware or a combination of hardware and software that is configured to receive and/or transmit data from/to a network and/or any other device, circuitry, or module in communication with circuitry 225, e.g., project management server 210. In this regard, the communications circuitry 204 may include, for example, a network interface for enabling communications with a wired or wireless communication network. Communications circuitry 204 may be configured to receive and/or transmit any data that may be stored by memory 201 using any protocol that may be used for communications between computing devices. For example, the communications circuitry 204 may include one or more network interface cards, antennae, transmitters, receivers, buses, switches, routers, modems, and supporting hardware and/or software, and/or firmware/software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the circuitry 225 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of circuitry 225, such as via a bus.

In some embodiments, development insight circuitry 205 may also or instead be included and configured to perform the functionality discussed herein related to providing a development unit performance insight interface component. Development insight circuitry 205 includes hardware components and/or software configured to support development unit insight-related functionality, features, and/or services of the circuitry 225 (e.g., project management server 210, client device 101A). In some embodiments, development insight circuitry 205 includes hardware components and/or software configured to support a machine learning model to provide development unit insight-related functionality, features, and/or services of the circuitry 225 (e.g., project management server 210, client device 101A). The development insight circuitry 205 may utilize processing circuitry, such as the processor 202, to perform its corresponding operations, and may utilize memory 201 to store collected information. The development insight circuitry 205 may send and/or receive data from development unit repository 215 and/or team member repository 220. In some implementations, the sent and/or received data may include identifier(s) (e.g., user identifier, team identifier, team member identifier, development unit identifier, project identifier, customer identifier, and/or the like), commitment data, performance metrics data, and associated data that is configured for association with, for example, generating development unit performance insight interface component(s) (e.g., development unit performance summary insight interface component and/or development unit performance detailed insight interface component). It should also be appreciated that, in some embodiments, the development insight circuitry 205 may include a separate processor, specially configured field programmable gate array (FPGA), or application specific interface circuit (ASIC) to perform its corresponding functions. For example, in some embodiments, some or all of the functionality of development insight circuitry 205 may be performed by processor 202. In this regard, some or all of the example processes and algorithms discussed herein can be performed by at least one processor 202 and/or development insight circuitry 205. For example, non-transitory computer readable storage media can be configured to store firmware, one or more application programs, and/or other software, which include instructions and other computer-readable program code portions that can be executed to control processors of the components of project management server 210 by circuitry 225 to implement various operations, including the examples shown herein. As such, a series of computer-readable program code portions may be embodied in one or more computer program products and can be used, with a device, project management server 210, database, and/or other programmable apparatus, to produce the machine-implemented processes discussed herein. It is also noted that all or some of the information discussed herein can be based on data that is received, generated and/or maintained by one or more components of the circuitry 225 (e.g., project management server 210, client device 101A, etc.). In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of circuitry 225.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a planning user interacting with the client device). Information/data generated at the client device (e.g., a result of the user interaction) can be received from the client device at the server.

In various embodiments of the present disclosure, an apparatus (e.g., project management server 210 or client device 101A) is configured to output a contextually relevant development unit performance insight interface component in a project management and collaboration system 200. FIGS. 3A and 3B each illustrate an example development unit performance summary insight interface component 301 structured in accordance with various embodiments of the subject disclosure. In a non-limiting example, the depicted development unit performance summary insight interface component 301 is a sprint performance summary insight interface component that is rendered to the project management user interface 300 in association with the planning of a sprint in an iterative project management environment. In some embodiments, for example in a backlog view project management user interface as depicted in FIG. 3A, the project management user interface 300 comprises one or more of a development unit performance insight interface component (e.g., development unit performance summary insight interface component 301), a development issue tracking pane 320 comprising one or more backlog development issues 321, and a view index pane 330 comprising one or more available views 331 of the associated project management user interface 300. In some further embodiments, an issue type insight interface component (e.g., issue type summary insight interface component 325), which is configured to display issue type metrics information associated with the planning of a selected development unit, is optionally rendered to, or as a portion of, the project management user interface 300. FIGS. 3A and 3B each illustrate an issue type summary insight interface component 325 structured in accordance with various embodiments of the subject disclosure. In a non-limiting example, the depicted issue type summary insight interface component 325 is rendered to the project management user interface 300 in association with the planning of a sprint in an iterative project management environment. Although the development issue tracking pane 320 is depicted as being arranged or rendered in a main pane of the project management user interface 300 and the development unit performance summary insight interface component 301 and issue type summary insight interface component 325 are depicted as being arranged or rendered in a sidebar pane of the project management user interface 300, such depictions are for purposes of illustration and not of limitation and other suitable variations of arranging or rendering the interface components, panes, and panels to the project management user interface 300 are also contemplated by this disclosure as will be apparent to one of ordinary skill in the art. Moreover, the development unit performance summary insight interface component 301 is depicted in association with a backlog view project development interface, however, other project management user interfaces are contemplated including, but not limited to, a board view, a deployments view, and a road maps view, as described herein.

The depicted development unit performance summary insight interface component 301 comprises a development unit commitment 302 of the selected development unit and a suggested development unit performance target 303 for the selected development unit, thereby exposing a first or summary level of such information. In the non-limiting example depicted in FIG. 3A, the selected development unit commitment 302 reflects a development unit commitment 302 (e.g., a sprint commitment) for the current sprint of 50 story points and the suggested development unit performance target 303 reflects a target sprint commitment (e.g., a target commitment range) of 23-28 story points (e.g., Over target of 23-28 points). Similarly, in the non-limiting example depicted in FIG. 3B, the selected development unit commitment 302 reflects an updated sprint commitment as described herein for the current sprint of 26 story points and the suggested development unit performance target 303 reflects a target sprint commitment of 23-28 story points.

In some embodiments, the development unit performance summary insight interface component 301 further comprises a visual emphasis element 304 configured to visually compare the selected development unit commitment 302 to the suggested development unit performance target 303. For example, in the non-limiting example depicted in FIG. 3A, the selected development unit commitment 302 (e.g., 50 story points) of the current sprint exceeds the suggested development unit performance target 303 (e.g., 23-28 story points). In some embodiments, the development unit performance summary insight interface component 301 comprises a visual emphasis element 304 to visually convey the discrepancy (i.e., that the commitment falls outside the target range) in the currently-assigned commitments compared to the suggested development unit performance target (e.g., based on a data-driven determination). For example, the visual representation associated with the visual emphasis element 304 may be an icon, text, and/or background displayed in the development unit performance summary insight interface component 301. The visual emphasis element 304 depicted in FIG. 3A comprises an arrow icon pointing up to indicate overcommitment as compared to the suggested development unit performance target. In some embodiments, the visual emphasis element 304 additionally or alternatively employs a contextually relevant coloring scheme to visually compare the selected development unit commitment 302 to the suggested development unit performance target 303. For example, in some embodiments, the text of the selected development unit commitment 302 is rendered in orange and/or red to indicate the perceived overcommitment. Other non-limiting examples include the selected development unit commitment 302 comprising an orange and/or red icon (e.g., indication of overload or overcommitment), and/or an orange and/or red background shading to indicate that the current level of commitment associated with the selected development unit (e.g., sprint) may be too much for the selected development unit. Additional examples of visual emphasis elements include emphasizing (e.g., coloring scheme, highlighted, bolded, italicized, enlarged, shaded, flashing, pulsing, or changing in size, etc.) an icon or text displayed as part of the development unit performance summary insight interface component 301. Such examples are for purposes of illustration and not of limitation and other suitable variations of visual indicators for visually conveying a discrepancy in the selected development unit commitment 302 as compared to the suggested development unit performance target 303 are also contemplated by this disclosure as will be apparent to one of ordinary skill in the art.

In the non-limiting example depicted in FIG. 3B, the updated selected development unit commitment 302 (e.g., 26 story points) of the current sprint is on target (e.g., falls within the target commitment range) with the suggested development unit performance target 303 (e.g., 23-28 story points). The depicted development unit performance summary insight interface component 301 comprises a visual emphasis element 304 to visually convey the accuracy of the currently-assigned commitment compared to the suggested development unit performance target (e.g., based on a data-driven determination). For example, the visual representation associated with the visual emphasis element 304 may be an icon, text, and/or background displayed in the development unit performance summary insight interface component 301. The visual emphasis element 304 depicted in FIG. 3B comprises a checkmark icon to indicate the currently-assigned commitment falls within the target range. In some embodiments, the visual emphasis element 304 additionally or alternatively employs a contextually relevant coloring scheme to visually compare the selected development unit commitment 302 to the suggested development unit performance target 303. For example, in certain embodiments, the text of the selected development unit commitment 302 is rendered in green to indicate the perceived accuracy of the projected commitment. Other non-limiting examples include the selected development unit commitment 302 comprising a green icon (e.g., a thumbs up or other indication of sufficient commitment) and/or a green background shading to indicate that the current level of commitment associated with the selected development unit (e.g., sprint) is adequate, sufficient, or otherwise on target with the suggested development unit performance target 303. Additional examples of visual emphasis elements include emphasizing (e.g., coloring scheme, highlighted, bolded, italicized, enlarged, shaded, flashing, pulsing, or changing in size, etc.) an icon or text displayed as part of the development unit performance summary insight interface component 301. Such examples are for purposes of illustration and not of limitation and other suitable variations of visually conveying that selected development unit commitment 302 is on target as compared to the suggested development unit performance target 303 are also contemplated by this disclosure as will be apparent to one of ordinary skill in the art.

Similarly, although not depicted, in another example, a visual emphasis element for a selected development unit commitment may comprise text in blue, a blue icon (e.g., an arrow or other indication of underload or under-commitment), and/or a blue background shading to indicate that there is capacity for additional commitment to the selected development unit. Additional examples of visual emphasis elements include emphasizing (e.g., coloring scheme, highlighted, bolded, italicized, enlarged, shaded, flashing, pulsing, or changing in size, etc.) an icon or text displayed as part of the development unit performance summary insight interface component. Such examples are for purposes of illustration and not of limitation and other suitable variations of visual indicators for visually conveying a discrepancy (e.g., an under commitment) in the selected development unit commitment as compared to the suggested development unit performance target are also contemplated by this disclosure as will be apparent to one of ordinary skill in the art.

The depicted issue type summary insight interface component 325 of FIGS. 3A and 3B comprises one or more issue type commitments of the selected development unit. In the non-limiting examples depicted in FIGS. 3A and 3B, the issue type summary insight interface component 325 displays the issue type ("The issue type Story is the top focus for this sprint.") associated with the largest or greatest portion 327 of the development unit commitment (e.g., a sprint commitment) of the selected development unit ("Alpha Max").

In some embodiments, the apparatus (e.g., project management server 210) is configured to generate one or more insight interface components and output such one or more insight interface components for rendering to the project management user interface 300 as described herein. For example, in the embodiments depicted in FIGS. 3A and 3B, the apparatus generated and outputted the development unit performance summary insight interface component 301 comprising the visual emphasis element 304 and the issue type summary insight interface component 325 for rendering to the project management user interface 300. In some embodiments, the apparatus generates and outputs the development unit performance summary insight interface component 301 and/or the issue type summary insight interface component 325 for rendering to the project management user interface 300 in response to detecting and/or receiving one or more insight interface component requests (e.g., a development unit performance summary insight interface component request and/or issue type summary insight interface component request) associated with the one or more insight interface components. For example, in some embodiments, the planning user accesses the development unit performance summary insight interface component 301 and/or the issue type summary insight interface component 325 by verbal command, gesture, on-screen dynamics (e.g., soft key), or other user interaction with the computing device wherein a planning user causes the computing device to generate one or more insight interface component requests (e.g., a development unit performance summary insight interface component request and/or issue type summary insight interface component request). For example, in some embodiments, the planning user interacts with, for example, a specific insight actuator button (e.g., "Show Insights" or "Insights") rendered on a visual display of the client device 101A that, when selected by the planning user, causes the client device 101A to generate one or more insight interface component requests. For example, in instances wherein the apparatus is a project management server 210, in response to the planning user clicking or activating the "Show Insights" actuator button displayed in association with the backlog view of the project management user interface, the client device 101A generates and transmits a temporary code representative of a development unit performance summary insight interface component request and/or an issue type summary insight interface component request to the project management server 210. In response to the receipt of the development unit performance summary insight interface component request and/or the issue type summary insight interface component request by the project management server 210, the corresponding one or more insight interface components are displayed (e.g., development unit performance summary insight interface component 301 and/or issue type summary insight interface component 325). In other embodiments, the planning user interacts with (e.g., hover user interaction), for example, a defined region of the project management user interface 300 activating the one or more insight interface component requests (e.g., a planning user hovers in a sidebar region of the project management user interface 300 for a threshold amount of time). In another exemplary embodiment, the planning user interacts with a create development unit actuator button (e.g., "Create Sprint"), wherein such user interaction generates the development unit performance summary insight interface component request and/or issue type summary insight interface component request in association with a create development unit request (e.g., a create sprint request). Such examples, however, are for purposes of illustration and not of limitation and other suitable variations of facilitating the generation of a development unit performance summary insight interface component request and/or issue type summary insight interface component request are also contemplated by this disclosure as will be apparent to one of ordinary skill in the art.

In some embodiments, the one or more insight interface component requests (e.g., a development unit performance summary insight interface component request) comprises a unique development unit identifier (e.g., sprint identifier) associated with the selected development unit (e.g., current sprint). For example, in some embodiments, the project management user interface 300 is associated with a selected development unit identifier. To provide context, in a non-limiting example, a planning user may be accessing a backlog view of the project management user interface associated with an existing, but not yet active, sprint that the team is currently planning. In some embodiments, the client device 101A receives the development unit identifier from the project management and collaboration system 200 (e.g., project management server 210) in association with generating and populating the backlog view of the project management user interface 300. In another non-limiting example, in association with creating a new development unit (e.g., creating a new sprint) at the client device 101A, the client session operating on the client device 101A is configured to generate a unique development unit identifier (e.g., a sprint identifier) in creation of the new development unit. Accordingly, in some embodiments, the one or more insight interface component requests (e.g., a development unit performance summary insight interface component request) comprises a unique development unit identifier associated with the selected development unit. In still further embodiments, the development unit identifier is generated at the project management and collaboration system 200 (e.g., project management server 210).

Additionally or alternatively, in some embodiments, the one or more insight interface component requests comprises a unique user identifier associated with the planning user. For example, a client device 101A-101N may receive or access the user identifier. To provide further context, the user identifier may be received remotely, via wireless communication or tethered communication, or directly, via input into one of the client devices 101A-101N. In some embodiments, the planning user may have a remote device, such as a mobile device or key fob that interacts with the client devices 101A-101N to transmit an user identifier and/or other related user data to authenticate the planning user. In another example, a planning user may simply provide login credentials through the interface of their client device 101A-101N. The client device 101A-101N then provides and/or transmits the unique user identifier to the apparatus (e.g., the project management server 210, the client device 101A-101N, etc.) as part of or in addition to the development unit performance summary insight interface component request and/or issue type summary insight interface component request. Additionally or alternatively, the one or more insight interface component requests (e.g., a development unit performance summary insight interface component request) comprises any one or more data points or identifiers necessary to cull relevant information in order to generate the development unit performance summary insight interface component. Non-limiting examples include project identifier, team identifier, team member identifier, customer identifier, sprint identifier, development unit type, and/or the like.

In some embodiments, with respect to a development unit performance summary insight interface component request, the apparatus (e.g., project management server 210) accesses past development unit performance metrics data based upon one or more data points. For example, in instances wherein the apparatus is a project management server 210 and the development unit performance summary insight interface component request comprises a development unit identifier and/or a development unit type (e.g., sprint), the project management server 210 queries a repository, such as development unit repository 215 and/or team member repository 220, for past development unit performance metrics data. Past development unit performance metrics data may contain a variety of performance metrics data associated with historical, completed, and/or past development units. For example, in some embodiments, past development unit identifiers are associated with one or more of development unit type, a total development unit commitment estimate value (e.g., the projected commitment of the development unit as assigned, such as in total story points assigned), a total development unit completion value (e.g., the actual work completed, such as in total story points actually completed) of the development unit. Additionally or alternatively, in some embodiments, past development units are analyzed such that one or more past development unit features are extracted and stored as past development unit performance metrics data in association with the past development unit identifier. For example, past development unit performance metrics data may comprise a project description attribute, team identifier, team member identifier(s), issue complexity value(s), issue type(s) (e.g., story, task, bug, idea, tech debt), issue type balance (e.g., issue type breakdown), seasonality data, and/or event data associated with the past development unit.

In some embodiments, the apparatus determines a suggested development unit performance target based at least in part on the past development unit performance metrics data. For example, in some embodiments, the accessed past development unit performance metrics data comprises a total development unit completion value and a total development unit commitment estimate value(s) for each of one or more completed development units. In some embodiments, the suggested development unit performance target is determined as an average of the total development unit completion values associated with one or more of the most recent completed development units. For example, in a non-limiting illustration, the suggested development unit performance target (e.g., 25.5 story points) for a sprint is determined as an average of the total development unit completion values associated with the five most recent completed development units (e.g., 24.0, 21.5, 23.1, 25.7, and 33.2 story points). In some embodiments, the suggested development unit performance target is a target range based on the total development unit completion value associated with one or more of the most recent completed development units. For example, in a non-limiting illustration, the depicted suggested development unit performance target 303 in FIGS. 3A and 3B is a target range (e.g., 23-28 story points) for a sprint that is based on the total development unit completion values associated with the five most recent completed development units (e.g., 24.0, 21.5, 23.1, 25.7, and 33.2 story points). In still further embodiments, the suggested development unit performance target is determined as a completion percentage associated with one or more of the most recent completed development units.

Moreover, the commitment unit (e.g., the assigned development unit commitment estimation methodology) associated with the determination is not limited to story points. To provide further context, the commitment unit associated with the determination of the suggested development unit performance target corresponds to the commitment unit (e.g., development unit commitment estimation methodology) associated with the selected development unit. In the above examples, the commitment unit of the selected development unit is story points, however, the commitment unit (e.g., development unit commitment estimation methodology) of a development unit can otherwise be determined or assigned by the team. For example, teams may choose to use story points, time, issue count, and/or any other customized commitment unit to estimate a commitment associated with a development unit (e.g., task, issue, story, bug, sprint, and/or the like). In some embodiments, if a development unit commitment estimation methodology is not assigned or otherwise associated with a development unit (e.g., task, issue, story, bug, sprint, and/or the like), the apparatus is configured to utilize or assign a default development unit commitment estimation methodology to determine a suggested development unit performance target. For example, in some embodiments, when a development unit commitment estimation methodology is not assigned or otherwise associated with a development unit, the apparatus is configured to utilize issue count by default. In other embodiments, when a development unit commitment estimation methodology is not assigned or otherwise associated with a development unit, the apparatus is configured to determine an estimated commitment value as described herein.

Additionally or alternatively to determining an average and/or percentage of total development unit completion values, the apparatus is configured to utilize one or more past development unit performance metrics data points to determine a suggested development unit performance target. For example, in some embodiments, the apparatus uses one or more of project description attribute, team identifier, team member identifier(s), issue complexity value(s), issue type(s) (e.g., story, task, bug, idea, tech debt), issue type balance (e.g., issue type breakdown), seasonality data, bottleneck data, and/or event data (e.g., timing of development unit corresponded to a ramp-up period, timing of development was in close proximity to a product launch or company-wide meeting, and/or the like) associated with one or more completed development units to determine a suggested development unit performance target. In a non-limiting example, the apparatus utilizes one or more of issue type(s), issue type balance, and team member identifier(s) to identify one or more (e.g., 5) past development units similar to the selected development unit. In a further non-limiting example, the apparatus is configured to determine an average of total development unit completion values of such identified similar past development units.

Additionally or alternatively, in embodiments wherein the one or more team members are associated with the selected development unit, the apparatus is configured to access team member data (e.g., via team member repository 220) associated with such team member identifier(s) to determine a suggested development unit performance target. For example, in some embodiments, the apparatus is configured to utilize one or more of team workload value (e.g., a team's total current workload), team member workload value (e.g., a team member's total current workload across all projects/teams), team member location data, team member skillset value, team member experience value, and/or the like, to determine a suggested development unit performance target. For example, a team member with 10 years of relevant experience may correspond to an increased suggested development unit performance target as compared to a team member with only 2 years of relevant experience.

Additionally or alternatively, in some embodiments, the apparatus provides for use of a machine learning model designed to leverage artificial intelligence in connection with the determination of a suggested development unit performance target. In determining the suggested development unit performance target, the apparatus may draw from a range of information sources that can be supplied to the machine learning model in order to make contextual suggestions or predictions as to a realistic suggested development unit performance target. For example, any one or more of the data described herein (e.g., past development unit performance metrics data, team member data, and/or the like) and correlations thereof can be used in connection with the machine learning model. For example, in some embodiments, although the varied data outputted in an agile project management environment is not necessarily comparable nor are the key performance indicators necessarily selectable by a human, the dissimilar aggregate data structure formed from such complex data corpus can be analyzed by the machine learning model to programmatically determine at least the suggested development unit performance target. In an aspect, the machine learning model thereby informs the development unit performance insight interface component, in near real-time, to provide such insight to the planning user.

Moreover, in some embodiments, the machine learning based model employed by the apparatus can be trained using such past development unit performance metrics data, team member data, and/or the like. For example, in some embodiments, the apparatus (e.g., via development insight circuitry 205) implements an unsupervised learning structure, a supervised learning structure, a reinforcement learning structure, a deep learning structure, and/or the like for programmatically determining correlations of the varied data and data formats to make contextual suggestions or predictions as to at least the suggested development unit performance target.

In some embodiments, the apparatus determines a selected development unit commitment. For example, in some embodiments, determining the selected development unit commitment comprises initially determining whether the selected development unit identifier is associated with an assigned development unit commitment estimation methodology. To provide context, if the selected development unit (e.g., the current sprint) is associated with an assigned development unit commitment estimation methodology (e.g., the issues associated with the current sprint are each associated with individual estimates of relative work such as story points), the apparatus (e.g., a project management server 210 of the project management and collaboration system 200) is configured to query a repository, such as development unit repository 215 and/or team member repository 220, for development unit commitment data associated with the selected development unit identifier (e.g., the current sprint). In some embodiments, the apparatus is configured to calculate the selected development unit commitment based on at least the development unit commitment data returned by the query and the associated assigned development unit commitment estimation methodology. For example, in an instance wherein the issues associated with the current sprint are each associated with story points, story points methodology is the assigned development unit commitment estimation methodology and the apparatus is configured to calculate the total committed story points value associated with the current sprint.

With respect to an issue type insight interface component request, the apparatus (e.g., project management server 210) is further configured to determine and rank issue type commitments associated with the selected development unit commitment. That is, in some embodiments, the apparatus determines one or more issue types associated with the selected development unit commitment and the relative percentage of each of the one or more issue types. In the depicted embodiments of FIGS. 3A and 3B, the issue type summary insight interface component 325 is predefined to include or render a predetermined number (e.g., 1) of issue type commitments. As such, the top number 327 (e.g., top 1) of issue type(s) corresponding to the predetermined number (e.g., 1) of issue type(s) defined for inclusion in the issue type summary insight interface component 325 is depicted ("The issue type Story is the top focus for this sprint."). Such example is for purposes of illustration and not of limitation and other suitable variations of determining the issue type(s) to be depicted in the issue type summary insight interface component (e.g., top 2 and the like) are also contemplated by this disclosure as will be apparent to one of ordinary skill in the art. In some embodiments, the apparatus depicts all of the ranked issue type commitments associated with the selected development unit to an issue type detailed insight interface component as described herein.

In some embodiments, the apparatus is further configured to cause storage of the suggested development unit performance target and the selected development unit commitment. For example, in some embodiments, a microservice associated with the apparatus (e.g., project management server 210)) is configured to programmatically aggregate and store the retrieved commitment data, suggested development unit performance target and the selected development unit commitment in a cache memory for future retrieval and/or manipulation.

In some embodiments, the project management server 210 is configured to monitor for and/or detect relevant commitment updates (e.g., development unit commitment update events) associated with the selected development unit identifier, and in still further embodiments, determine an updated selected development unit commitment based on an analysis of the stored (e.g., in the aggregate) selected development unit commitment and the detected development unit commitment update events. For example, as additional issues (e.g., additional commitments) are added to or removed from a current sprint by the planning user and/or other team members, the project management server 210 detects the relevant development unit commitment update events (e.g., an issue associated with 2.5 points is added to the current sprint), determines an updated selected development unit commitment based on an analysis of the development unit commitment update event and the aggregated development unit commitment previously stored in association with the selected development unit identifier, and transmits (e.g., pushes) an updated selected development unit commitment corresponding to such commitment changes to the client device(s) 101A-101N of the team members associated with the selected development unit (e.g., the current sprint). That is, as the apparatus detects such events, the apparatus is configured to determine an updated selected development unit commitment based on an analysis of the stored selected development unit commitment (e.g., stored in the aggregate in cache memory as a pre-calculated commitment total) and the detected development unit commitment update events. In still further embodiments, the apparatus is configured to cause storage of the updated selected development unit commitment (e.g., in the aggregate in the cache memory) and update the development unit performance summary insight interface component 301 to apply the updated selected development unit commitment as depicted in FIG. 3B. In some embodiments, the apparatus is configured to update the development unit performance summary insight interface component 301 to apply the updated selected development unit commitment in real-time or near real-time. In some further embodiments, the apparatus is configured to update the development unit performance summary insight interface component 301 to apply the updated selected development unit commitment at a predetermined time interval (e.g., every 1 second, 2 seconds, 3 seconds, etc.).

In still further embodiments, in order to provide a persistent development unit performance insight interface component for all team members, an aggregate permissions protocol is employed by the apparatus (e.g., project management server 210) which disregards individual permissions levels of team members in the determination and storage of the development unit commitment data, and instead, permissions are applied at the aggregate. For example, in a non-limiting illustration, Thomas is a developer associated with Sprint Alpha Max and has a first permissions level, such first permissions level not allowing Thomas to individually view ISSUE-4063 or data otherwise associated with ISSUE-4063 in the development issue tracking pane 320 of the backlog view of the project management user interface associated with Thomas' client device. Linda is the scrum leader associated with Sprint Alpha Max and has a second permissions level, such second permissions level allowing Linda to individually view ISSUE-4063 or data otherwise associated with ISSUE-4063 in the development issue tracking pane 320 of the backlog view of the project management user interface associated with Linda's client device, Although Thomas is unable to access or view ISSUE-4063, in certain embodiments, Thomas is able to view the value of the total sprint commitment associated with Sprint Alpha Max, including the story points associated with ISSUE-4063 when it is assigned to Sprint Alpha Max. Thus, the enabling Thomas and Linda to view the same velocity (e.g., selected development unit commitment in comparison to suggested development unit performance target) in a persistent development unit performance insight interface component, regardless of permissions levels of the individual team members.

Returning to FIG. 3A, in some embodiments, the apparatus is configured to determine a visual emphasis element 304 (e.g., coloring scheme, highlighted, bolded, italicized, enlarged, shaded, flashing, pulsing, or changing in size, etc.) as described herein for the selected development unit commitment 302. In some embodiments, the apparatus determines the visual emphasis element 304 by analyzing whether the selected development unit commitment 302 is less than, equal to, or more than the suggested development unit performance target 303 and establishes a visual emphasis element 304 corresponding to such analysis such that the visual emphasis element 304 is configured to visually compare the selected development unit commitment 302 to the suggested development unit performance target 303 as described herein.

In some embodiments, the apparatus is configured to detect and/or determine that the updated selected development unit commitment warrants an updated visual emphasis element (e.g., the selected development unit commitment was less than the suggested target but the updated development unit commitment is more than the suggested target). In such embodiments, the apparatus is configured to determine the updated visual emphasis element (e.g., orange icon instead of blue icon when the updated development unit commitment exceeds the suggested development unit performance target) for the updated selected development unit commitment and apply the updated visual emphasis element to the updated selected development unit commitment in the development unit performance summary insight interface component 301.

In some embodiments, the apparatus is further configured to receive a development unit performance detailed insight interface component request. For example, returning to FIG. 3A, in some embodiments, the depicted development unit performance summary insight interface component 301 further comprises a development unit performance detailed insight actuator button 306 (e.g., ">", "More", "Detail", and the like) for accessing or exposing a second or detailed level of information. In some embodiments, the client device 101A is configured to detect user interaction with the development unit performance summary insight interface component 301 (e.g., via the development unit performance detailed insight actuator button 306), thereby generating a development unit performance detailed insight interface component request which is transmitted to the project management server 210.

In some embodiments, the apparatus is configured (e.g., project management server 210) to determine a visual element for each of the one or more past development unit identifiers associated with the suggested development unit performance target. For example, as depicted in FIGS. 3C and 3E, two-dimensional vertical bars 308 are associated with each of the five past development units (e.g., the five most recent sprints) associated with (e.g., previously used to determine) the suggested development unit performance target 303. Additional examples of visual elements include horizontal bars, line chart, radial column chart, donut chart, icons, pie chart, bubble chart, etc. Such examples are for purposes of illustration and not of limitation and other suitable variations of visual elements are also contemplated by this disclosure as will be apparent to one of ordinary skill in the art.

As further depicted in FIGS. 3C and 3E, in some embodiments, the visual element 308 for each of the one or more past development unit identifiers associated with the suggested development unit performance target 303 is a vertical bar 308 in a vertical bar chart format, wherein the vertical bars 308 are visually adjacent to one another, a total height of each of the vertical bars 308 corresponds to a total committed development unit estimate associated with the corresponding past development identifier, and an emphasis height of each of the vertical bars 308 corresponds to a total development unit completion value associated with the corresponding past development unit identifier. In some embodiments, a coloring scheme of the visual elements 308 associated with the past development unit identifiers is utilized to de-emphasize the visual elements. For example, in some embodiments, the visual elements 308 are rendered in gray or other color in contrast to a visual emphasis element, with the emphasis height of the vertical bars 308 rendered in a darker gray or other color than compared to the total height of the vertical bar 308.

In some further embodiments, the apparatus is configured to determine a correlated visual element 309 for the selected development unit commitment, the correlated visual element 309 of the selected development unit commitment is correlated to the visual elements 308 of the past development unit identifiers of the suggested development unit performance target. For example, as depicted in FIGS. 3C and 3E, similar to the past development units of the suggested development unit performance target, a two-dimensional vertical bar 309 is associated with the selected development unit commitment. Additional examples of correlated visual elements include horizontal bars, line chart, radial column chart, donut chart, icons, pie chart, bubble chart, etc. Such examples are for purposes of illustration and not of limitation and other suitable variations of correlated visual elements are also contemplated by this disclosure as will be apparent to one of ordinary skill in the art.

As depicted in FIGS. 3C and 3E, in some embodiments, the correlated visual element 309 for the selected development unit commitment is a correlated vertical bar 309 in the vertical bar chart format, a total height of the correlated vertical bar 309 corresponding to a development unit commitment estimate value associated with the selected development unit commitment, and the visual emphasis element is a contextually relevant coloring scheme applied to the correlated vertical bar of the selected development unit commitment. For example, in FIGS. 3C and 3E, the visual emphasis element may be a contextually relevant coloring scheme (e.g., orange) to depict the discrepancy (e.g., over-commitment) in the selected development unit commitment. In a further example, the visual emphasis element may be a contextually relevant coloring scheme (e.g., green) to depict the sufficiency of the selected development unit commitment.

In some embodiments, the apparatus is configured to generate a development unit performance detailed insight interface component 311 comprising the visual elements of the one or more past development unit identifiers associated with the suggested development unit performance target and the correlated visual element of the selected development unit commitment, wherein the visual emphasis element is applied to the correlated visual element of the selected development unit commitment. For example, the vertical bars of the five past development units used to determine the suggested development unit performance target may be depicted in grey while the visual emphasis element (e.g., coloring scheme, bolding, etc.) is applied to the correlated vertical bar of the selected development unit commitment (e.g., current sprint). In still further embodiments, the apparatus is configured to replace the development unit performance summary insight interface component 301 with the development unit performance detailed insight interface component 311 in the project management user interface 300 as depicted in FIGS. 3C and 3E.

In still further embodiments, the apparatus is configured to detect a hover user interaction corresponding to at least one of the visual elements of the one or more past development unit identifiers in the development unit performance detailed insight interface component and output past development unit performance metrics data associated with the past development unit identifier associated with the at least one of the visual elements corresponding to the detected hover user interaction. For example, as depicted in FIGS. 3D and 3F, in response to detecting a hover user interaction by the planning user (e.g., detecting pointer) in association with the vertical element, the apparatus outputs selected past development unit performance metrics data such as development unit title, total development unit commitment estimate value, total development unit completion value, a commitment completion percentage, and/or the like, to an informational interface component 310.

In some embodiments, the apparatus determines that a selected development unit identifier is not associated with an assigned development unit commitment estimation methodology. To provide context, if the selected development unit (e.g., the current sprint) is not associated with an assigned development unit commitment estimation methodology (e.g., the issues associated with the current sprint are not associated with individual estimates of relative work, such as story points) and there is not a default development unit commitment estimation methodology (e.g., issue count), the apparatus (e.g., project management server 210) is configured to extrapolate analysis of past development unit data to parse development unit data associated with the selected development unit identifier and determine a commitment estimate value for the selected development unit identifier. For example, in some embodiments, the apparatus is configured to access past development unit data to identify one or more past development units. The apparatus is further configured to extract one or more past development unit features and associated past development unit commitment estimate values from each of the one or more identified past development units. For example, the apparatus is configured to associate commitment estimate values with different types of development unit features. To provide context, bugs may correspond to, on average, 1 story point or 5 hours, of commitment estimate values. Similarly, issues associated with user interface implementation in a software development project may, on average, correspond to 3 story points or 12 hours, in commitment estimate values. Utilizing such extracted information, the apparatus is further configured to access development unit data associated with the selected development unit identifier (e.g., the current sprint), parse the development unit data based at least in part on the extracted past development unit features, and assign a first development unit commitment estimation methodology for the selected development unit identifier based at least in part on the past development unit commitment estimate values associated with the identified past development units. For example, based on the analysis of the past development unit data, extracted features, and associated commitment estimate values in story points, the apparatus is configured to parse the current sprint and calculate a commitment estimate value for the current sprint (e.g., parsed sprint comprises features similar to the extracted features of the past development unit data and accounting for the associated story point values), the commitment estimate value corresponding to the selected development unit commitment. In some embodiments, calculating a commitment estimate value for the selected development unit identifier is based at least in part on an analysis of the assigned first development unit commitment estimation methodology, the extracted one or more past development unit features, the past development unit commitment estimate values, and the parsed development unit data.

Additionally or alternatively, in some embodiments, the apparatus provides for use of a machine learning model designed to leverage artificial intelligence in connection with the determination and/or calculation of the commitment estimate value corresponding to the selected development unit commitment. In determining the commitment estimate value, the apparatus may draw from a range of information sources that can be supplied to the machine learning model. For example, any one or more of the data described herein (e.g., past development unit performance metrics data, team member data, and/or the like) and correlations thereof can be used in connection with the machine learning model. Moreover, in an aspect, the machine learning based model employed by the apparatus can be trained using such past development unit performance metrics data, team member data, and/or the like.

Returning to the issue type summary insight interface component, in some embodiments, the apparatus is further configured to receive an issue type detailed insight interface component request. For example, in some embodiments, as depicted in FIGS. 3A and 3B, the issue type summary insight interface component 325 further comprises an issue type detailed insight actuator button 326 (e.g., ">", "More", "Detail", and the like) for accessing or exposing a second or detailed level of information. In some embodiments, the client device 101A is configured to detect user interaction with the issue type summary insight interface component 325 (e.g., via the issue type detailed insight actuator button 326), thereby generating and transmitting an issue type detailed insight interface component request to the project management server 210.

In response to receiving the detailed insight interface component request, the apparatus (e.g., project management server 210) is configured to generate an issue type detailed insight interface component comprising all of the ranked issue type commitments associated with the selected development unit. In some further embodiments, the issue type detailed insight interface component 336 is configured to display the relative commitment of each of the one or more issue type(s) in comparison to the other one or more issue type(s). For example, in the example embodiment depicted in FIG. 3G, the development unit commitment of the selected development unit (e.g., a sprint entitled "Alpha Max") comprises three issue type commitments 337: Story, Bug, and TechOps. In still further embodiments, the relative commitments of each of the one or more issue type(s) of the issue type detailed insight interface component 336 is configured to be displayed in one or more ways, such as visually depicted via visual status icons (e.g., horizontal bar(s)) in FIG. 3G. Other configurations for depicting the relative commitments of the one or more issue type commitments are contemplated by this disclosure, such as alphanumerically, vertical bar(s), pie chart, line chart, radial column chart, donut chart, icons, bubble chart, etc.).

In still further embodiments, the apparatus is configured to detect a hover user interaction in association with at least one of the depicted issue type commitments 337 in the issue type detailed insight interface component 336 and output additional information associated with the issue type commitment 337 corresponding to the detected hover user interaction. For example, as depicted in FIG. 3H, in response to detecting a hover user interaction by the planning user (e.g., detecting pointer) in association with the horizontal issue type bar of the story issue type commitment 337, the apparatus outputs selected additional information associated with the insight component 336 (e.g., total number of issues of the selected issue type, overall percentage of the selected issue type, and/or the like) to the informational interface component 310 (e.g., depicting 24 story issues or 68% of the development unit commitment is committed to stories).

In still further embodiments of the present disclosure, an apparatus (e.g., project management server 210) is configured to output a contextually relevant development unit performance insight interface component in association with an active development unit. For example, users access the board view of a project management user interface 400 after the planning phase of a development unit (e.g., sprint) is completed and the development unit is active (e.g., team members are addressing issues committed to the selected sprint). The board view tracks and provides the current status (e.g., to do, in progress, completed, and the like) of the issues committed to selected active development unit. In some embodiments, for example, in a board view project management user interface 400 as depicted in FIG. 4A, the project management user interface 400 comprises one or more of a development unit performance insight interface component (e.g., development unit performance summary insight interface component 401), a development issue status tracking pane 420 comprising one or more defined regions 421 for tracking the status (e.g., TO DO, IN PROGRESS, COMPLETED or DONE) of each issue committed to the selected active development unit, and a view index pane 430 comprising one or more available views 431 of the associated project management user interface 400. Although the development issue status tracking pane 420 is depicted as being arranged or rendered in a main pane of the project management user interface 400 and the development unit performance summary insight interface component 401 is depicted as being arranged or rendered in a sidebar pane of the project management user interface 400, such depictions are for purposes of illustration and not of limitation and other suitable variations of arranging or rendering the interface components, panes, and panels to the project management user interface 400 are also contemplated by this disclosure as will be apparent to one of ordinary skill in the art.

In some embodiments, the apparatus (e.g., project management server 210) is configured to generate and transmit a development unit performance summary insight interface component 401 to be rendered to a board view of a project management user interface 400 in association with an active (e.g., in progress or ongoing) development unit in response to receiving a development unit performance summary insight interface component request. For example, in some embodiments, a user accesses the development unit performance summary insight interface component 401 via user interaction (e.g., user interaction with a specific insight actuator button, such as "Insights" or "Show Insights") rendered to a board view of a project management user interface 400. The development unit performance insight interface component (e.g., a development unit performance summary insight interface component 401 or a development unit performance detailed insight interface component 411) rendered in association with a selected active development unit (e.g., in a board view) is configured to indicate the progress and/or current status of a selected active development unit.

In some embodiments, to generate the development unit performance summary insight interface component 401 in association with a board view of the project management user interface 400, the apparatus determines a development unit commitment and a commitment completion percentage measurement of the selected development unit. To determine a development unit commitment, in some embodiments, the project management server 210 is configured to query a repository, such as development unit repository 215, for development unit commitment data associated with the selected development unit (e.g., a development unit identifier associated with the development unit). In some embodiments, the apparatus is configured to calculate the selected development unit commitment based on at least the development unit commitment data returned by the query, and in some embodiments, the associated assigned development unit commitment estimation methodology as described herein. For example, in an instance wherein the issues associated with the current sprint are each associated with story points, story points methodology is the assigned development unit commitment estimation methodology and the apparatus is configured to calculate the total committed story points value associated with the current sprint.

In some embodiments, the project management server 210 is configured to query a repository, such as development unit repository 215, for development unit issue status data associated with the selected development unit (e.g., a development unit identifier associated with the development unit). The commitment completion percentage measurement is determined by dividing a value corresponding to the portion of the development unit that is identified as completed by a value corresponding to the overall development unit commitment, the result of which is multiplied by 100. For example, in association with an active development unit associated with an assigned development unit commitment estimation methodology of story points, a total development unit completion value (e.g., the actual work completed, such as in total story points actually completed) of the development unit is divided by the total development unit commitment estimate value (e.g., the projected commitment of the development unit as assigned, such as in total story points assigned) of the development unit, and multiplied by 100. Other commitment estimation methodologies are also contemplated by this disclosure (e.g., number of issues, amount of time, etc.). In some embodiments, the apparatus further determines the in progress percentage measurement and/or the not yet started percentage measurement in similar fashion.

In still further embodiments, the project management server 210 generates the development unit performance summary insight interface component such that it comprises an alphanumeric depiction 408 of the commitment completion percentage measurement corresponding to the calculated percentage of completion (e.g., a numeric character and a percentage syntax element, such as "40% done" in FIG. 4A).

In some embodiments, the generated development unit performance summary insight interface component comprises a visual progress status indicator component 409 (e.g., a progress bar element, such as a horizontal status bar or vertical status bar, a pie chart element, a line chart, radial column chart, donut chart, icons, an infographic element, bubble chart, or the like). The visual progress status indicator component 409 comprises a start point, a progress point, and an end point, wherein the progress point is configured to progress from the start point that indicates a beginning of a development unit to the end point that indicates an end or completion of the development unit, whereby the progress of the progress point from the start point to the end point graphically indicates the commitment completion percentage measurement of the development unit completed.

As further depicted in FIG. 4A, additionally or alternatively, in some embodiments, the visual progress status indicator component 409 is divided into one or more portions, each portion corresponding to a relative percentage of the development unit and to visually compare the portions that have been completed vs. in progress vs. not yet started. For example, as depicted in FIG. 4A, a first visual portion corresponds to the completed portion, a second visual portion corresponds to the portion of the development unit currently in progress, and a third visual portion corresponds to the portion of the development unit that has not yet been started. In still further embodiments, each portion is depicted in a different color to further visually delineate the different portions (e.g., the completed portion is green, the in progress portion is blue, and the not yet started portion is gray). Additional examples of visually delineating the one or more portions of the visual progress status indicator component include various coloring schemes, highlighting, sizing schemes, shaded, etc. Such examples are for purposes of illustration and not of limitation and other suitable variations of visually comparing the one or more portions of the visual progress status indicator 409 are also contemplated by this disclosure as will be apparent to one of ordinary skill in the art.

The generated development unit performance summary insight interface component is transmitted to a client device 101A for display. As described herein with respect to a development unit performance summary insight interface component associated with a backlog view of a project management user interface, in some embodiments, the apparatus is further configured to receive a development unit performance detailed insight interface component request. For example, in some embodiments, as depicted in FIG. 4A, the development unit performance summary insight interface component 401 further comprises a development unit performance detailed insight actuator button 406 (e.g., ">", "More", "Detail", and the like) for accessing or exposing a second or detailed level of information. In some embodiments, the client device 101A is configured to detect user interaction with the development unit performance insight interface component 401 (e.g., via the development unit performance detailed insight actuator button 406), thereby generating and transmitting a development unit performance detailed insight interface component request to the project management server 210.

In response to receiving the detailed insight interface component request, the apparatus (e.g., project management server 210) is configured to generate a development unit performance detailed insight interface component comprising further information associated with the completed portion, in progress portion, and not yet started portion of the active development unit. For example, as depicted in FIG. 4B, in some embodiments, the development unit performance detailed insight interface component 411 comprises an alphanumeric depiction of the percentage measurement corresponding to each of the completed portion, in progress portion, and not yet started portion (e.g., 40%, 40%, and 20% as depicted in FIG. 4B). In still further embodiments, the alphanumeric depiction of each percentage measurement is visually related to the corresponding portion of the visual progress status indicator component 409 (e.g., text of 40% completed or done and corresponding portion of visual progress status indicator component 409 is green, text of 40% in progress and corresponding portion of visual progress status indicator component 409 is blue, and text of 20% not yet started and corresponding portion of visual progress status indicator component 409 is gray). As described herein with respect to a development unit performance summary insight interface component associated with a backlog view of a project management user interface, in some embodiments, the apparatus is further configured to cause storage of one or more of the selected development unit commitment, the commitment completion percentage measurement, the in progress percentage measurement, and the not yet started percentage measurement. For example, in some embodiments, a microservice associated with the apparatus (e.g., project management server 210)) is configured to programmatically aggregate and store the retrieved commitment data, the selected development unit commitment, the commitment completion percentage measurement, the in progress percentage measurement, and the not yet started percentage measurement in a cache memory for future retrieval and/or manipulation. Additionally or alternatively, permissions are applied to the data in the aggregate to enable a persistent insight interface component as described herein. That is, in order to provide a persistent development unit performance insight interface component for all team members, an aggregate permissions protocol is employed by the apparatus (e.g., project management server 210) which disregards individual permissions levels of team members in the determination and storage of the development unit commitment data and percentage measurements, and instead, permissions are applied at the aggregate.

In some embodiments, the apparatus is configured to monitor for and/or detect relevant status updates (e.g., development unit status update events) associated with the selected development unit identifier, and in still further embodiments, determine updated commitment completion percentage measurement(s), in progress percentage measurement(s), and not yet started percentage measurement(s) based on an analysis of the stored (e.g., in the aggregate) data and the detected development unit status update events. For example, as team members begin work on and/or complete various issues (e.g., commitments) in a current active sprint by the team members, the project management server 210 detects the relevant development unit status update events (e.g., an issue associated with 2.5 points is completed by a team member in the current sprint), determines an updated commitment completion percentage measurement (additionally or alternatively, updated in progress percentage measurement and not yet started percentage measurement) based on an analysis of the development unit status update event and the aggregated development unit data previously stored in association with the selected development unit identifier, and transmits (e.g., pushes) an updated commitment completion percentage measurement, an updated in progress percentage measurement, and/or an updated not yet started percentage measurement corresponding to such activity and status changes to the client device(s) 101A-101N of the team members associated with the selected development unit (e.g., the current active sprint). In still further embodiments, the apparatus is configured to cause storage of the updated percentage measurements (e.g., in the aggregate in the cache memory) and update the development unit performance summary insight interface component 401 and/or development unit performance detailed insight interface component 411 to apply the updated percentage measurement(s). In some embodiments, the apparatus is configured to update the development unit performance summary insight interface component 401 in real-time or near real-time. In some further embodiments, the apparatus is configured to update the development unit performance summary insight interface component 401 at a predetermined time interval (e.g., every 1 second, 2 seconds, 3 seconds, etc.).

In still further embodiments of the present disclosure, an apparatus (e.g., project management server 210) is configured to output a contextually relevant development unit performance insight interface component in association with deployed development units (e.g., deployed units of code, deployed features, etc.). For example, users access the deployments view of a project management user interface 500 to track deployments. The deployments view tracks and provides the current status and various deployment stages (e.g., non-production deployment, production deployment, release, etc.) of development units, such as issues, units of codes, and features. In some embodiments, for example, in a deployments view project management user interface 500 as depicted in FIG. 5A, the project management user interface 500 comprises one or more of a development unit performance insight interface component (e.g., deployments frequency summary insight interface component 501, cycle time summary insight interface component 525, etc.), a deployment stage tracking pane 520 comprising deployment stage tracking data associated with one or more development units, and a view index pane 530 comprising one or more available views 531 of the associated project management user interface 500. Although the deployment stage tracking pane 520 is depicted as being arranged or rendered in a main pane of the project management user interface 400 and the development unit performance summary insight interface components 501, 525 are depicted as being arranged or rendered in a sidebar pane of the project management user interface 500, such depictions are for purposes of illustration and not of limitation and other suitable variations of arranging or rendering the interface components, panes, and panels to the project management user interface 500 are also contemplated by this disclosure as will be apparent to one of ordinary skill in the art.

In some embodiments, the apparatus (e.g., project management server 210) is configured to generate and transmit one or more development unit performance summary insight interface component 501, 525 to be rendered to a deployments view of a project management user interface 500 in response to receiving a development unit performance summary insight interface component request. For example, in some embodiments, a user accesses the development unit performance summary insight interface component 501, 525 via user interaction (e.g., user interaction with a specific insight actuator button, such as "Insights" or "Show Insights") rendered to a deployments view of a project management user interface 500. The development unit performance insight interface component (e.g., a deployments frequency summary insight interface component 501 or a cycle time summary insight interface component 525) rendered in association with a deployments view is configured to indicate performance metrics associated with a team's or project's deployments.

In some embodiments, to generate the development unit performance summary insight interface component in association with a deployments view of the project management user interface 500, such as a deployment frequency summary insight interface component 501, the apparatus determines a total number of deployments 502 associated with a selected period of time (e.g., daily, weekly, monthly, etc.) and a corresponding calculated deployment frequency 503 (e.g., average daily deployments, average weekly deployments, average monthly deployments, etc.) at which the associated team identifier and/or project identifier are deploying development units. For example, in some embodiments, the deployment frequency input insight interface components are associated with a pre-defined period of time used to determine the total number of deployments and average deployment frequency. In some embodiments, the period of time is pre-defined by the team identifier and/or user identifier. In still further embodiments, the user is able to selected the period of time.

To determine a total number of deployments associated with a selected period of time (e.g., pre-defined such as daily, weekly, monthly, etc.), in some embodiments, the project management server 210 is configured to query a repository, such as development unit repository 215, for development unit deployment data associated with the selected team identifier and/or project identifier associated with the deployments view. In some embodiments, the apparatus is configured to calculate the total number of deployments based on at least the development unit deployment data returned by the query. In some embodiments, the project management server 210 is further configured to determine a corresponding calculated deployment frequency (e.g., average daily deployments, average weekly deployments, average monthly deployments, etc.) at which the associated team identifier and/or project identifier are deploying development units based on the development unit deployment data.

In some embodiments, to generate the development unit performance summary insight interface component in association with a deployments view of the project management user interface 500, such as a cycle time summary insight interface component 525, the apparatus determines an average cycle time 541 during a selected (e.g., current) period that it takes to get a development unit (e.g., feature, unit of code, issue) from commitment to deployment and a past average cycle time 542 for the one or more corresponding past periods of time (e.g., daily, weekly, monthly, etc.) for the associated team identifier and/or project identifier. In some embodiments, the project management server 210 is configured to query a repository, such as development unit repository 215, for development unit data associated with the selected team identifier and/or project identifier associated with the deployments view to perform such calculations In some embodiments, the one or more generated development unit performance summary insight interface components 501, 525 comprise a visual emphasis element 504 to visually compare the calculated deployment frequency 503 to the determined total number of deployments 502 and/or the current average cycle time 541 to the corresponding average cycle time 542. Examples of visual representation associated with a visual emphasis element 504 include, but are not limited to, an icon, text, and/or background displayed in the development unit performance summary insight interface component. For example, in a non-limiting illustration, a visual emphasis element 504 in a deployment frequency summary insight interface component 501 may comprise text in orange, an orange icon (e.g., an arrow or other indication of falling below average deployments), and/or an orange background shading to indicate that the current deployment frequency is falling behind the calculated deployment frequency 503. In a further example, a visual emphasis element comprises text in green, a green icon (e.g., a thumbs up, a checkmark, or other indication of sufficient deployment frequency, etc.), and/or a green background shading to indicate that the current deployment frequency is adequate, sufficient, or otherwise on target with the calculated deployment frequency 503. Additional examples of visual emphasis elements include emphasizing an icon or text displayed on a graphical user interface (e.g., coloring scheme, highlighted, bolded, italicized, enlarged, shaded, flashing, pulsing, or changing in size, etc.). Additional examples of visual emphasis elements include numerous embodiments described herein, and would be understood to include any other visual indicators in light of the present disclosure.

The generated development unit performance summary insight interface component (e.g., deployment frequency summary insight interface component 501, cycle time summary insight interface component 525) is transmitted to a client device 101A for display. As described herein with respect to a development unit performance summary insight interface component associated with a board view and a backlog view of a project management user interface, in some embodiments, the apparatus is further configured to receive a development unit performance detailed insight interface component request. For example, in some embodiments, as depicted in FIG. 5A, the development unit performance summary insight interface component 501 further comprises a development unit performance detailed insight actuator button 506 (e.g., ">", "More", "Detail", and the like) for accessing or exposing a second or detailed level of information. In some embodiments, the client device 101A is configured to detect user interaction with the development unit performance insight interface component 501 (e.g., via the development unit performance detailed insight actuator button 506), thereby generating and transmitting a development unit performance detailed insight interface component request to the project management server 210.

In response to receiving the detailed insight interface component request, the apparatus (e.g., project management server 210) is configured to generate a development unit performance detailed insight interface component comprising further information associated with deployment metrics. For example, as depicted in FIG. 5B, in some embodiments, the development unit performance detailed insight interface component 511 comprises a vertical bar chart 505 indicating the daily deployments over a period of time and further information regarding the selected period of time for calculating the corresponding deployment frequency (e.g., 3.6 average daily deployments over last 28 days in FIG. 5B). As depicted in FIG. 5C with respect to a cycle time insight interface component 525, the cycle time detailed insight interface component 535 comprises a vertical bar chart 540 indicating the daily hours worked over a period of time and further information regarding the selected period of time for calculating the corresponding average cycle time (e.g., 156 hours average cycle time over last 4 weeks).

As described herein with respect to a development unit performance summary insight interface component associated with a backlog view of a project management user interface, in some embodiments, the apparatus is further configured to cause storage of the development unit data, the development unit deployment data, the total number of deployments, the corresponding calculated deployment frequency, the current average cycle time, and the corresponding average cycle time. For example, in some embodiments, a microservice associated with the apparatus (e.g., project management server 210) is configured to programmatically aggregate and store the retrieved development unit data, the development unit deployment data, the total number of deployments, the corresponding calculated deployment frequency, the current average cycle time, and the corresponding average cycle time. in a cache memory for future retrieval and/or manipulation. Additionally or alternatively, permissions are applied to the data in the aggregate to enable a persistent insight interface component as described herein. That is, in order to provide a persistent development unit performance insight interface component for all team members, an aggregate permissions protocol is employed by the apparatus (e.g., project management server 210) which disregards individual permissions levels of team members in the determination and storage of the development unit data, the development unit deployment data, the total number of deployments, the corresponding calculated deployment frequency, the current average cycle time, and the corresponding average cycle time, and instead, permissions are applied at the aggregate.

In some embodiments, the apparatus is configured to monitor for and/or detect relevant deployment status updates (e.g., deployment status update events) associated with the selected development unit identifier, team identifier, and/or project identifier, and in still further embodiments, determine updated total number of deployments, corresponding calculated deployment frequency, current average cycle time, and corresponding average cycle time based on an analysis of the stored (e.g., in the aggregate) data and the detected deployment status update events. For example, as additional features and/or units of code are deployed to various stages of production, the project management server 210 detects the relevant deployment status update events, determines an updated total number of deployments and corresponding calculated deployment frequency based on an analysis of the deployment status update event and the aggregated deployment data previously stored, and transmits (e.g., pushes) an updated total number of deployments and calculated deployment frequency corresponding to such activity and status changes to the client device(s) 101A-101N of the team members associated with the team identifier and/or project identifier. In still further embodiments, the apparatus is configured to cause storage of the updated deployment data and deployment frequency determinations (e.g., in the aggregate in the cache memory) and update the development unit performance summary insight interface component 501 and/or development unit performance detailed insight interface component 511 to apply the updated total number of deployments and corresponding calculated deployment frequency. In some embodiments, the apparatus is configured to update the development unit performance summary insight interface component 501 in real-time or near real-time. In some further embodiments, the apparatus is configured to update the development unit performance summary insight interface component 501 at a predetermined time interval (e.g., every 1 second, 2 seconds, 3 seconds, etc.).

Example Operations Performed

Having described the apparatus, system, and exemplary circuitry comprising embodiments of the present disclosure, it should be understood that the apparatus may proceed to output a contextually relevant development unit performance insight interface component in a project management and collaboration system in a number of ways. FIG. 6A is a flowchart broadly illustrating a series of operations or process blocks that are executed or performed to output a contextually relevant development unit performance insight interface component in accordance with some example embodiments of the present disclosure. The operations illustrated in FIG. 6A may, for example, be performed by, with the assistance of, and/or under the control of an apparatus (e.g., project management server 210, client device 101A), as described above. In this regard, performance of the operations may invoke one or more of memory 201, processor 202, input/output circuitry 203, communications circuitry 204, and/or development insight circuitry 205.

In the embodiment illustrated in FIG. 6A, the flowchart illustrates method 600 which includes detecting an insight interface component request at Block 602. For example, the project management server 210 may include means, such as the processor 202, communications circuitry 204, development insight circuitry 205, or the like, for detecting an insight interface component request. In some embodiments, the insight interface component request comprises one or more of a development unit performance summary insight interface component request and an issue type insight interface component request. In some embodiments, the insight interface component request is detected in response to user interaction with a project management user interface. In still further embodiments, the insight interface component request is associated with a selected development unit identifier.

As shown in Block 604, in some embodiments, the project management server 210 includes means, such as the processor 202, input/output circuitry 203, communications circuitry 204, development insight circuitry 205, or the like, to access past development unit performance metrics data. For example, in some embodiments, the project management server 210 queries a repository, such as development unit repository 215 and/or team member repository 220, using a development unit identifier (e.g., sprint identifier), for past development unit performance metrics data.

At Block 606, the method 600 further includes determining a suggested development unit performance target based at least in part on the past development unit performance metrics data. For example, the project management server 210 may include means, such as the processor 202, communications circuitry 204, development insight circuitry 205, or the like, for determining a suggested development unit performance target. In some embodiments, the suggested development unit performance target is determined as an average of the total development unit completion values associated with one or more of the most recent completed development units in the past development unit performance metrics data. For example, in a non-limiting illustration, the suggested development unit performance target (e.g., 25.5 story points) for a sprint is determined as an average of the total development unit completion values associated with the five most recent completed development units (e.g., 24.0, 21.5, 23.1, 25.7, and 33.2 story points). In some embodiments, the suggested development unit performance target is a target range based on the total development unit completion value associated with one or more of the most recent completed development units.

At Block 608, the method 600 further includes determining a selected development unit commitment. For example, the project management server 210 may include means, such as the processor 202, communications circuitry 204, development insight circuitry 205, or the like, for determining a selected development unit commitment. The process for determining the selected development unit commitment is described in greater detail below with respect to FIG. 7.

As illustrated at Block 610, in some embodiments, method 600 further includes determining a visual emphasis element for the selected development unit commitment. For example, the project management server 210 may include means, such as the processor 202, communications circuitry 204, development insight circuitry 205, or the like, for determining the visual emphasis element. As described herein, in some embodiments, the visual emphasis element is configured to visually compare the selected development unit commitment to the suggested development unit performance target.

As illustrated at Blocks 612 and 614, in some embodiments, the project management server 210 further include means, such as the processor 202, input/output circuitry 203, communications circuitry 204, development insight circuitry 205, or the like, to generate a development unit performance summary insight interface component comprising the visual emphasis element and output the development unit performance summary insight interface component for rendering to the project management user interface.

FIG. 6B is a signal diagram of an example data flow represented by method 600. That is, FIG. 6B illustrates an example signal diagram illustrating data flow interactions between an project management server, a repository, and a client device when outputting a contextually relevant development unit summary performance insight interface component in accordance with one embodiment. Method 600 is described as being performed by a client device 101A, a project management server 210, and development unit repository 215. These may be similar to those previously discussed with regards to FIG. 1.

Turning now to FIG. 7, example operations are shown for determining the selected development unit commitment. As with FIG. 6A, the operations illustrated in FIG. 7 may, for example, be performed by the project management server 210 which may include means, such as the processor 202, input/output circuitry 203, communications circuitry 204, development insight circuitry 205, or the like, for determining a selected development unit commitment. As illustrated at Block 702, in some embodiments, method 700 further includes determining whether the selected development unit identifier is associated with an assigned development unit commitment estimation methodology.

Subsequently, at Blocks 704 and 706, in response to determining that the selected development unit identifier is associated with an assigned development unit commitment estimation methodology, the apparatus (e.g., project management server 210) includes means, such as the processor 202, input/output circuitry 203, communications circuitry 204, or the like, for querying a development unit repository based on the selected development unit identifier and receiving development unit commitment data associated with the selected development unit identifier.

At Block 708, the method 700 further includes calculating the selected development unit commitment based on at least the development unit commitment data and the associated assigned development unit commitment estimation methodology. For example, if the selected development unit (e.g., the current sprint) is associated with an assigned development unit commitment estimation methodology (e.g., the issues associated with the current sprint are each associated with individual estimates of relative work such as story points), the apparatus (e.g., a project management server 210) calculates the total committed story points value associated with the current sprint.

FIGS. 6A, 6B, and 7 thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the project management server 210 and executed by a processor 202 of the project management server 210. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for outputting a contextually relevant development unit performance insight interface component in a project management and collaboration system, the apparatus comprising at least one processor, and at least one memory including program code, the at least one memory and the program code configured to, with the at least one processor, cause the apparatus to at least:

detect an insight interface component request associated with a selected development unit in response to user interaction with a project management user interface, wherein the insight interface component request is associated with a selected development unit identifier corresponding to the selected development unit;
  access past development unit performance metrics data;
  determine, via the at least one processor, a suggested development unit performance target for the selected development unit based at least in part on the past development unit performance metrics data;
  determine, via the at least one processor, a selected development unit commitment for the selected development unit;
  determine, via the at least one processor, a visual emphasis element for the selected development unit commitment based at least in part on the suggested development unit performance target, wherein the visual emphasis element is configured to visually compare the selected development unit commitment to the suggested development unit performance target the visual emphasis element visually depicting an overcommitment, an accurate commitment, or a capacity for additional commitment of the selected development unit;

generate a development unit performance summary insight interface component comprising the visual emphasis element; and
output the development unit performance summary insight interface component for rendering to the project management user interface.

2. The apparatus of claim 1, wherein determining the selected development unit commitment comprises:
determining whether the selected development unit identifier is associated with an assigned development unit commitment estimation methodology;
in response to determining that the selected development unit identifier is associated with an assigned development unit commitment estimation methodology, querying a development unit repository based on the selected development unit identifier;
receiving development unit commitment data associated with the selected development unit identifier; and
calculating the selected development unit commitment based on at least the development unit commitment data and the associated assigned development unit commitment estimation methodology.

3. The apparatus of claim 2, wherein the assigned development unit commitment estimation methodology is selected from story points, time, issue count, and customized estimation.

4. The apparatus of claim 2, wherein the program code is further configured to, with the at least one processor, cause the apparatus to:
cause storage of the suggested development unit performance target and the selected development unit commitment;
detect development unit commitment update events associated with the selected development unit identifier;
determine an updated selected development unit commitment based on the stored selected development unit commitment and the detected development unit commitment update events;
cause storage of the updated selected development unit commitment; and
output an updated development unit performance summary insight interface component, the updated development unit performance summary insight interface component applying the updated selected development unit commitment.

5. The apparatus of claim 4, wherein determining the updated selected development unit commitment and outputting the updated development unit performance summary insight interface component are done in real-time or near real-time.

6. The apparatus of claim 4, wherein determining the updated selected development unit commitment and outputting the updated development unit performance summary insight interface component are done at a predetermined time interval.

7. The apparatus of claim 4, wherein the program code is further configured to, with the at least one processor, cause the apparatus to:
determine, via the at least one processor, an updated visual emphasis element for the updated selected development unit commitment; and
apply the updated visual emphasis element to the updated selected development unit commitment in the updated development unit performance summary insight interface component.

8. The apparatus of claim 1, wherein determining the suggested development unit performance target is based on a machine learning model, wherein the machine learning model is trained using past development unit performance metrics data.

9. The apparatus of claim 1, wherein the visual emphasis element employs a contextually relevant coloring scheme to visually compare the selected development unit commitment to the suggested development unit performance target.

10. The apparatus of claim 1, wherein the suggested development unit performance target is associated with one or more past development unit identifiers and the program code is further configured to, with the at least one processor, cause the apparatus to:
detect a development unit performance detailed insight interface component request in response to user interaction with the development unit performance summary insight interface component;
determine, via the at least one processor, a visual element for each of the one or more past development unit identifiers associated with the suggested development unit performance target;
determine, via the at least one processor, a correlated visual element for the selected development unit commitment;
generate a development unit performance detailed insight interface component comprising the visual elements of the one or more past development unit identifiers associated with the suggested development unit performance target and the correlated visual element of the selected development unit commitment, wherein the visual emphasis element is applied to the correlated visual element of the selected development unit commitment; and
replace the development unit performance summary insight interface component with the development unit performance detailed insight interface component in the project management user interface.

11. The apparatus of claim 10, wherein the program code is further configured to, with the at least one processor, cause the apparatus to:
detect a hover user interaction corresponding to at least one of the visual elements of the one or more past development unit identifiers in the development unit performance detailed insight interface component; and
output past development unit performance metrics data associated with the past development unit identifier associated with the at least one of the visual elements corresponding to the detected hover user interaction.

12. The apparatus of claim 10, wherein the visual element for each of the one or more past development unit identifiers associated with the suggested development unit performance target is a vertical bar in a vertical bar chart format, wherein each vertical bar is visually adjacent to one another, a total height of each vertical bar corresponds to a total committed development unit estimate associated with the corresponding past development identifier, and an emphasis height of each vertical bar corresponds to a total development unit completion value associated with the corresponding past development unit identifier.

13. The apparatus of claim 12, wherein the correlated visual element for the selected development unit commitment is a correlated vertical bar in the vertical bar chart format, a total height of the correlated vertical bar corresponding to a development unit commitment estimate value associated with the selected development unit commitment, and the visual emphasis element is a contextually relevant coloring scheme applied to the correlated vertical bar of the selected development unit commitment.

14. The apparatus of claim 1, wherein the past development unit performance metrics data comprises a total development unit completion value and a total development unit commitment estimate value for each of one or more completed development units.

15. The apparatus of claim 14, wherein the suggested development unit performance target is determined as an average of the total development unit completion value associated with one or more of the most recent completed development units.

16. The apparatus of claim 14, wherein the suggested development unit performance target is a target range based on the total development unit completion value associated with one or more of the most recent completed development units.

17. The apparatus of claim 14, wherein the suggested development unit performance target is determined as a completion percentage associated with one or more of the most recent completed development units.

18. The apparatus of claim 14, wherein the past development unit performance metrics data further comprises seasonality data and event data associated with each of the one or more completed development units.

19. The apparatus of claim 1, wherein the project management user interface is associated with a planning phase of a selected development unit.

20. The apparatus of claim 1, wherein the insight interface component request is associated with a create development unit request.

21. The apparatus of claim 1, wherein the program code is further configured to, with the at least one processor, cause the apparatus to:
in response to detecting the insight interface component request, determine one or more issue type commitments associated with the selected development unit commitment;
determine a relative percentage of each of the one or more issue type commitments;
rank the one or more issue type commitments based on each respective relative percentage;
generate an issue type summary insight interface component comprising at least one of the one or more ranked issue type commitments; and
output the issue type summary insight interface component for rendering to the project management user interface.

22. The apparatus of claim 21, wherein the program code is further configured to, with the at least one processor, cause the apparatus to:
detect an issue type detailed insight interface component request in response to user interaction with the issue type summary insight interface component;
determine, via the at least one processor, a visual status icon for each of the one or more ranked issue type commitments;
generate an issue type detailed insight interface component comprising the visual status icon of the one or more ranked issue type commitments; and
replace the issue type summary insight interface component with the issue type detailed insight interface component in the project management user interface.

23. An apparatus for outputting a contextually relevant development unit performance insight interface component in a project management and collaboration system, the apparatus comprising at least one processor, and at least one memory including program code, the at least one memory and the program code configured to, with the at least one processor, cause the apparatus to at least:
detect an insight interface component request associated with a selected development unit in response to user interaction with a project management user interface, wherein the insight interface component request is associated with a selected development unit identifier;
determine, via the at least one processor, a selected development unit commitment;
determine, via the at least one processor, a commitment completion percentage measurement of the selected development unit commitment corresponding to the selected development unit;
determine, via the at least one processor, a visual progress status indicator component, wherein the visual progress status indicator component is configured to visually depict the commitment completion percentage measurement of the selected development unit commitment;
generate a development unit performance summary insight interface component comprising the visual progress status indicator component and a development unit performance detailed insight actuator button configured to receive user input for accessing or exposing a development unit performance detailed insight interface component associated with the selected development unit; and
output the development unit performance summary insight interface component for rendering to the project management user interface.

24. The apparatus of claim 23, wherein the visual progress status indicator component comprises at least three portions, a first portion associated with a completed portion, a second portion associated with an in progress portion, and a third portion associated with a not yet started portion of the selected development unit commitment.

25. The apparatus of claim 23, wherein the program code is further configured to, with the at least one processor, cause the apparatus to:
detect a development unit performance detailed insight interface component request in response to user interaction with the development unit performance summary insight interface component;
determine a relative percentage measurement for each of a completed portion of the development unit commitment, an in progress portion of the development unit commitment, and a not yet started portion the development unit commitment;
generate a development unit performance detailed insight interface component comprising the visual progress status indicator component and an alphanumeric depiction of each of the relative percentage measurements of each of the in progress portion, the completed portion, and the not yet started portion; and
replace the development unit performance summary insight interface component with the development unit performance detailed insight interface component in the project management user interface.

26. An apparatus for outputting a contextually relevant development unit performance insight interface component in a project management and collaboration system, the apparatus comprising at least one processor, and at least one memory including program code, the at least one memory and the program code configured to, with the at least one processor, cause the apparatus to at least:
detect an insight interface component request associated with a selected development unit in response to user interaction with a project management user interface, wherein the insight interface component request is associated with a selected team identifier;

determine, via the at least one processor, a total number of deployments associated with the selected team identifier corresponding to a pre-defined period of time;

determine, via the at least one processor, a deployment frequency associated with the selected team identifier corresponding to one or more past pre-defined periods of time;

determine, via the at least one processor, a visual emphasis element, wherein the visual emphasis element is configured to visually compare the total number of deployments to the deployment frequency;

generate a first development unit performance summary insight interface component comprising the visual emphasis element; and output the first development unit performance summary insight interface component for rendering to the project management user interface, wherein the first development unit performance summary insight interface component is associated with a deployments view of the project management user interface, the deployments view associated with tracking of completed or deployed development units.

* * * * *

UNITED STATES PATENT AND TRADEMARK OFFICE
CERTIFICATE OF CORRECTION

PATENT NO. : 11,693,655 B2  Page 1 of 1
APPLICATION NO. : 17/233775
DATED : July 4, 2023
INVENTOR(S) : Sa et al.

It is certified that error appears in the above-identified patent and that said Letters Patent is hereby corrected as shown below:

In the Claims

Column 54,
In Claim 1, Line 64, "target the visual" should read --target, the visual--.

Signed and Sealed this
Twenty-sixth Day of December, 2023

Katherine Kelly Vidal
*Director of the United States Patent and Trademark Office*